United States Patent
Bohrarper et al.

(10) Patent No.: US 9,883,284 B2
(45) Date of Patent: Jan. 30, 2018

(54) SYSTEMS AND METHODS FOR AUTOMATIC MIXING OF MEDIA

(71) Applicant: Spotify AB, Stockholm (SE)

(72) Inventors: Par Mikael Bohrarper, Gothenburg (SE); Sten Garmark, Stockholm (SE); Niklas Martin Gustavsson, Kallered (SE); John Fredrik Wilhelm Noren, Gothenburg (SE); Gustav Söderström, Stockholm (SE); Babar Zafar, Gothenburg (SE)

(73) Assignee: Spotify AB (SE)

( * ) Notice: Subject to any disclaimer, the term of this patent is extended or adjusted under 35 U.S.C. 154(b) by 0 days.

(21) Appl. No.: 14/289,438

(22) Filed: May 28, 2014

(65) Prior Publication Data

US 2014/0355789 A1 Dec. 4, 2014

Related U.S. Application Data

(60) Provisional application No. 61/829,195, filed on May 30, 2013.

(51) Int. Cl.
*H04B 1/00* (2006.01)
*H04R 3/00* (2006.01)
(Continued)

(52) U.S. Cl.
CPC ......... *H04R 3/00* (2013.01); *G06F 17/30772* (2013.01); *G10H 1/0025* (2013.01);
(Continued)

(58) Field of Classification Search
CPC .... H04H 60/04; G11B 27/028; G11B 27/038; G11B 27/036; G11B 27/10;
(Continued)

(56) References Cited

U.S. PATENT DOCUMENTS

| | | | |
|---|---|---|---|
| 2013/0031216 A1* | 1/2013 | Willis et al. | 709/219 |
| 2013/0123019 A1* | 5/2013 | Sullivan | A63F 13/12 463/42 |
| 2013/0290818 A1* | 10/2013 | Arrasvuori et al. | 715/201 |

FOREIGN PATENT DOCUMENTS

| | | |
|---|---|---|
| GB | 2464545 A | 4/2010 |
| WO | WO 2008/004971 A1 | 1/2008 |

OTHER PUBLICATIONS

Aubio, "What is Aubio?," Aubio, a Library for Audio Labelling, downloaded on May 30, 2013 from http://aubio.org/, 2 pgs.
(Continued)

*Primary Examiner* — Vivian Chin
*Assistant Examiner* — Con P Tran
(74) *Attorney, Agent, or Firm* — Morgan, Lewis & Bockius LLP

(57) ABSTRACT

Systems and methods for mixing music are disclosed. Audio mix information is received from a plurality of users. Mix rules are determined from the audio mix information from the plurality of users, wherein the mix rules include a first mix rule associated with a first audio item. The first mix rule relates to an overlap of the first audio item with another audio item. The first mix rule is made available to one or more clients. In some implementations, making the first mix rule available to the one or more clients includes transmitting, to the first client, information enabling the first client to playback a transition between the first audio item and the second audio item in accordance with the first mix rule.

19 Claims, 13 Drawing Sheets

(51) Int. Cl.
*G11B 27/036* (2006.01)
*G11B 27/038* (2006.01)
*G10H 1/00* (2006.01)
*G06F 17/30* (2006.01)
*G10H 7/00* (2006.01)
*H04N 21/262* (2011.01)
*H04N 21/44* (2011.01)
*H04N 21/466* (2011.01)
*H04N 21/81* (2011.01)
*G11B 27/10* (2006.01)

(52) U.S. Cl.
CPC .......... *G10H 1/0058* (2013.01); *G10H 7/008* (2013.01); *G11B 27/036* (2013.01); *G11B 27/038* (2013.01); *H04N 21/26258* (2013.01); *H04N 21/44016* (2013.01); *H04N 21/4661* (2013.01); *H04N 21/8113* (2013.01); *G10H 2210/125* (2013.01); *G10H 2210/131* (2013.01); *G10H 2210/145* (2013.01); *G10H 2210/155* (2013.01); *G10H 2210/331* (2013.01); *G10H 2210/385* (2013.01); *G10H 2220/116* (2013.01); *G10H 2240/125* (2013.01); *G10H 2240/131* (2013.01); *G10H 2240/305* (2013.01); *G10H 2250/035* (2013.01); *G11B 27/10* (2013.01)

(58) Field of Classification Search
CPC .......... G06F 3/04847; G06F 17/30772; G10H 2250/035; G10H 1/0025; G10H 1/0058; G10H 7/008; G10H 2210/125; G10H 2210/131; G10H 2210/145; G10H 2210/155; G10H 2240/125; G10H 2240/305; G10H 2210/331; G10H 2210/385; G10H 2220/116; G10H 2240/131; H04R 2420/01; H04R 3/00; H04N 21/26258; H04N 21/44016; H04N 21/4661; H04N 21/8113
USPC ....... 381/119, 61; 700/94; 84/660, 625, 697; 369/3, 4; 715/727
See application file for complete search history.

(56) References Cited

OTHER PUBLICATIONS

Vamp Plugins, "The Vamp Audio Analysis Plugin System," downloaded on May 30, 2013 from http://www.vamp-plugins.org/, 2 pgs.
Spotify AB, Communication Pursuant to Article 94(3) EPC, EP14170269.6, dated Mar. 16, 2015, 7 pgs.

* cited by examiner

| Track Name | Track ID | User ID | Fade-in Start | Fade-in Stop | Fade-out Start | Fade-out Stop | Fade-in Effect | Fade-out Effect | ... |
|---|---|---|---|---|---|---|---|---|---|
| Stayin' Alive | 9273 | User 1 | 0:00 | 0:08 | 4:40 | 4:46 | {1: 5, 2} | {3: 3} | ... |
| Stayin' Alive | 9273 | User 2 | 0:02 | 0:04 | 4:43 | 4:46 | {5: 7} | | ... |
| Stayin' Alive | 9273 | User 3 | 0:00 | 0:12 | 4:00 | 4:10 | | | ... |
| Stayin' Alive | 9273 | User 4 | | | 4:40 | 4:46 | | {3: 4} | ... |
| Stayin' Alive | 9273 | User 5 | 0:18 | 0:18 | 4:40 | 4:46 | {1: 2, 4} | {3: 2} | ... |

Figure 5A

| | Track Name | Track ID | Fade-in Start (508) | Fade-in Stop (510) | Fade-out Start (512) | Fade-out Stop (514) | Fade-in Effect (516) | Fade-out Effect (518) | ... |
|---|---|---|---|---|---|---|---|---|---|
| 561 | Stayin' Alive | 9273 | 0:00 | 0:08 | 4:40 | 4:46 | {1: 5, 2} | {3: 3} | ... |
| 562 | Brick House | 1504 | 0:06 | 0:10 | | | {5: 7} | | ... |
| 563 | Hot Stuff | 6587 | 0:00 | 0:00 | 0:00 | 0:00 | | | ... |
| 564 | When Doves Cry | 7892 | | | 3:18 | 3:30 | | {3: 4} | ... |
| | ... | | | | | | | | |
| 565 | Hot Stuff to When Doves Cry | 6587 | | | 3:20 | 3:25 | | {3: 4} | ... |
| | | 7892 | 0:00 | 0:05 | | | | | ... |

Figure 5B

| Mix Style Name | 1st Song Fade Out Start | 1st Song Fade Out Stop | 2nd Song Fade In Start | 2nd Song Fade in Stop | Effect 1 | |
|---|---|---|---|---|---|---|
| Vibrato Cross-fade | [Lookup] | [Lookup] | [Match Song 1 Value] | [Match Song 1 Value] | {1: 6, 2} | ... |
| Best Effect | End – 5 sec | End | 0 | 5 | [Lookup] | ... |
| Magic Mix | [Lookup] | [Lookup] | [Lookup] | [Lookup] | [Lookup] | ... |
| ... | | | | | | |

Figure 6

SYSTEMS AND METHODS FOR AUTOMATIC MIXING OF MEDIA

RELATED APPLICATIONS

This claims priority to U.S. Provisional Patent Application No. 61/829,195, entitled "Systems and Methods for Automatic Mixing of Media," filed May 30, 2013, which is incorporated by reference herein in its entirety.

TECHNICAL FIELD

The disclosed implementations relate generally to mixing of media, and more specifically, to methods for automatic mixing of music using crowd-sourced information.

BACKGROUND

Modern media content providers offer streaming content, such as music, from large catalogs. Content providers generate revenue from paying users and advertisements, and pay the artists and other rights holders for the right to distribute their content.

Interaction with the music that users consume through such services is typically limited to creating, editing, and storing playlists. The songs in these playlists are usually played sequentially, with no blending of the songs or other effects (e.g., user-applied overdubs, overlays of multiple songs, transition effects, etc.).

In particular, media mixing techniques, such as blending tracks from one song to another in a playlist (e.g., crossfading), or creating remixes or other derivative works (e.g., by adding effects to songs or combining parts of different songs to create a "remix" or a "mashup") are currently not available in streaming services. Thus, users who wish to use these techniques are forced to find alternatives to the streaming services, thus depriving the artists and other rights holders from compensation and lowering the membership of the streaming service.

Accordingly, it would be useful to improve media streaming services with technology to assist consumers in mixing and adding effects to media content, while at the same time compensating the artists and rights holders.

SUMMARY

The present application describes systems and methods for modifying, mixing, and/or remixing music within the context of a media streaming service. (While the term "streaming service" is used herein, provision of media content by the service need not conform to any particular data transfer technique or protocol unless otherwise stated.) For example, users can select predefined "mix rules" to be applied during a transition between two songs in a playlist. Mix rules define or control one or more aspects of the playback of the songs to which they are applied, including, but not limited to, sound effects, tempo, pitch, volume, and fade-in and fade-out times.

Mix rules relate to various ways of modifying and/or manipulating playback of content items. For example, some mix rules specify how a transition between two content items (e.g., a crossfade) will sound. This includes, for example, crossfade duration, sound effects to be applied during the transition (e.g., flanger, reverb, etc.), playback parameter adjustments to be applied during the transition (e.g., pitch matching, tempo matching, etc.), and the like.

Other mix rules are used to create "mashups" or "remixes" of one or more content items. This includes, for example, "sampling" parts of content items to overlay on a base content item, combining two or more content items (or portions thereof), adding sound effects or other musical content (e.g., bass lines, drum beats, instrumental/vocal sounds, etc.) to a base content item, and the like. Mix rules can be applied to individual tracks, transitions between tracks, an entire playlist, portions of a playlist, etc. Also, different mix rules can be applied to different tracks (or transitions therebetween) in a playlist. For example, a crossfade effect may be specified for the transitions between some songs, but not others.

Mix rules specify values for many different playback parameters, as described herein, and need not relate specifically to a mix of multiple content items. For example, a mix rule can specify that a reverb effect should be applied to the last n seconds of a single song. Moreover, mix rules can specify values for a single parameter (e.g., a crossfade duration), or multiple parameters (e.g., a crossfade duration and multiple effects to be applied during the crossfade duration). Predefined sets of one or more mix rules are sometimes referred to herein as "mix styles."

In some implementations, mix rules are generated manually. Mix rules may be created manually, for example, by a human operator of the streaming media service hand-picking values for playback parameters and/or effects, overlays, and the like. Such mix rules are then made available to users of the media streaming service, and, when selected, cause media content to be played back in accordance with the mix rule. Mix rules may also be created manually by users of the system. For example, a playlist editor (e.g., an interface or application through which a user interacts with the media content) includes controls for selecting effects and values of playback parameters to be applied during a song transition (or during playback of a single song).

Mix rules can also be "crowdsourced." Crowdsourcing mix rules refers to deriving mix rules based on mix information generated by users of the media streaming service. Mix rules and mix information are the same type of information (e.g., parameters and values of parameters for modifying and/or manipulating playback of content items). As used herein, "mix information" is used to refer to user-generated mix rules (e.g., parameters and values specifying the user-generated mix rules) that are received or accessed by the media streaming service, and from which "mix rules" can be crowdsourced.

Substantial information about mixing preferences can be obtained from crowdsourced mix information. For example, as discussed herein, song fade-in and fade-out locations, sound effects and their settings, settings for playback parameters, etc., can all be generalized from mix information from a group of users. For example, the streaming service can determine, through crowdsourcing, that a large number of people select a particular fade-out location in a particular song. As another example, the content provider can determine that a large number of people apply a "flanger" effect to songs associated with a "techno" genre. As yet another example, the content provider can determine that many users apply a reverb effect to the transition between two particular songs, such as Led Zeppelin's "What Is and What Should Never Be" and "The Lemon Song."

Crowdsourced mix information is used in various ways. For example, in some implementations, it is used as the basis for a content provider to create predefined mix rules or mix styles. In particular, the streaming media service can determine (e.g., using automatic data extraction and/or analysis techniques) that most transitions between "classic rock" songs use a reverb effect and a 5 second fade-in/fade-out duration, and thus create a predefined "classic rock transition" mix style. Crowdsourced mix information can also be used to create customized real-time mixes and/or song transitions. For example, a playlist editor can provide an option for "auto-mix," which will pick one or more mix rules to apply to a transition between two selected songs based on crowdsourced information about one or both of the selected songs. As another example, an "auto-mashup" style identifies a second song to overlay with a selected song based on crowdsourced information about the selected song (e.g., based on a determination that many users of the service have previously overlayed the second song over the selected song).

Streaming services often store media content on servers remote from the client devices. Accordingly, mix rules may be stored in (or in association with) a playlist database associated with the streaming service. The mix rules may alternatively or additionally be stored on client devices. More specifically, users will often apply mix rules to content items in a playlist. The mix rules are then stored in association with those playlists (either on the client devices or on one or more remote computer systems) so that the user can access the playlist and the mix information at a later time (and possibly from a different computer or device).

Mix rules and/or mix information is, in some implementations, stored as metadata associated with the content items to which they apply. For example, in some implementations, it is embedded in, attached to, or otherwise associated with the file of the content item (e.g., in an ID3 container of an MP3 file). In some other implementations, it is stored in a separate metadata repository (e.g., a metadata database) in association with the content item and/or an identifier of the content item.

In some implementations, where a mix rule or mix information relates to two (or more) content items (e.g., as would be the case with a crossfade effect between two specific songs), it can be stored in a database and is associated with the content items and/or identifiers of the content items.

Some artists and/or content owners may not allow users of a streaming service to modify their tracks with certain effects, apply certain mixing or remixing techniques, or the like. For example, some artist might only allow crossfades of their songs, while others might allow users unrestricted permission to mix, remix, or otherwise modify their music. Such preferences may be included in the license agreement between the artist/content owner and the streaming service. Accordingly, in some implementations, such restrictions and/or limitations are stored by the streaming service (e.g., in a license information database, or in association with particular content items, such as in a metadata database or repository).

EXEMPLARY IMPLEMENTATIONS

A method is provided for mixing music. The method is performed at an electronic device having one or more processors and memory storing one or more programs for execution by the one or more processors. The method includes receiving audio mix information from a plurality of users; determining mix rules from the audio mix information from the plurality of users, wherein the mix rules include a first mix rule associated with a first audio item, the first mix rule relating to an overlap of the first audio item with another audio item; and making the first mix rule available to one or more clients.

In some implementations, the audio mix information includes user-selected values of a set of one or more playback parameters used to generate transitions between overlapping audio items.

In some implementations, the first mix rule includes an overlap starting position of the first audio item, indicating a playback time at which to begin overlapping the first audio item with a following audio item. In some implementations, the overlap starting position of the first audio item is a median of user-selected values, from the audio mix information, of the overlap starting position. In other implementations, the overlap starting position of the first audio item is a mean of user-selected values, from the audio mix information, of the overlap starting position.

In some implementations, the first mix rule also includes an overlap ending position of the first audio item, indicating a playback time at which to end overlapping the first audio item with a preceding audio item.

In some implementations, the first mix rule specifies an effect to be applied to one or both of the first audio item and the another audio item during the overlap of the first audio item and the another audio item.

In some implementations, the first mix rule specifies predefined values of the set of one or more playback parameters for generating a transition between the first audio item and a second audio item that is adjacent to the first audio item in a playlist, wherein the transition includes overlapping at least a part of the first audio item and the second audio item.

In some implementations, the method further includes receiving, from a first client of the one or more clients, information indicating that the first audio item is to be mixed with a second audio item in accordance with the first mix rule; and making the first mix rule available to the one or more clients includes transmitting, to the first client, information enabling the first client to playback a transition between the first audio item and the second audio item in accordance with the first mix rule. In some implementations, the second audio item is adjacent to the first audio item in a playlist associated with a user of the first client. In some implementations, the first audio item precedes the second audio item in the playlist. In other implementations, the second audio item precedes the first audio item in the playlist. In some implementations, the information indicating that the first audio item is to be mixed with the second audio item in accordance with the first mix rule specifies that an ending of the first audio item is to be mixed with a beginning of the second audio item.

In some implementations, the first mix rule relates to an overlap of an ending of the first audio item with a beginning of a next audio item; and the mix rules include a second mix rule relating to an overlap of a beginning of the first audio item with an ending of a preceding audio item. In some implementations, the method includes receiving, from the first client, information indicating that the first audio item is to be mixed with a third audio item in accordance with the second mix rule, wherein the third audio item precedes the first audio item in a playlist associated with the first client; and making the second mix rule available to the one or more clients, including transmitting, to the first client, information enabling the first client to playback a transition between the third audio item and the first audio item in accordance with the second mix rule.

In some implementations, the method further includes receiving, from a second client of the one or more clients, information indicating that the first audio item is to be mixed with a second audio item in accordance with the first mix rule; and making the first mix rule available to the one or more clients includes transmitting, to the second client, information enabling the second client to playback a transition between the first audio item and the second audio item in accordance with the first mix rule.

In some implementations, the mix rules include a second mix rule associated with a pair of audio items, the second mix rule relating to an overlap of the pair of audio items, and the method further includes receiving, from a third client of the one or more clients, information indicating that the pair of audio items are to be mixed in accordance with the second mix rule; and making the second mix rule available to the one or more clients, including transmitting, to the third client, information enabling the third client to playback a transition between the pair of audio items in accordance with the second mix rule.

In some implementations, the method further includes receiving, from a first client of the one or more clients, information indicating that the first audio item is to be mixed with a second audio item in accordance with the first mix rule; and making the first mix rule available to the one or more clients includes transmitting, to the first client, an audio stream including the first audio item mixed with the second audio item in accordance with the first mix rule.

In some implementations, the method further includes organizing the mix rules into one or more mix styles. In some implementations, respective ones of the mix styles include a plurality of the mix rules.

In accordance with some implementations, a computer system (e.g., a client system or server system) includes one or more processors, memory, and one or more programs; the one or more programs are stored in the memory and configured to be executed by the one or more processors and the one or more programs include instructions for performing the operations of the method described above. In accordance with some implementations, a non-transitory computer readable storage medium has stored therein instructions which when executed by one or more processors, cause a computer system (e.g., a client system or server system) to perform the operations of the methods described above.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 5A-5B are illustrations of exemplary tables storing mix rules and/or mix information, in accordance with some implementations.

FIG. 6 is an illustration of an exemplary table storing mix rules, in accordance with some implementations.

DETAILED DESCRIPTION

Figure 1A:
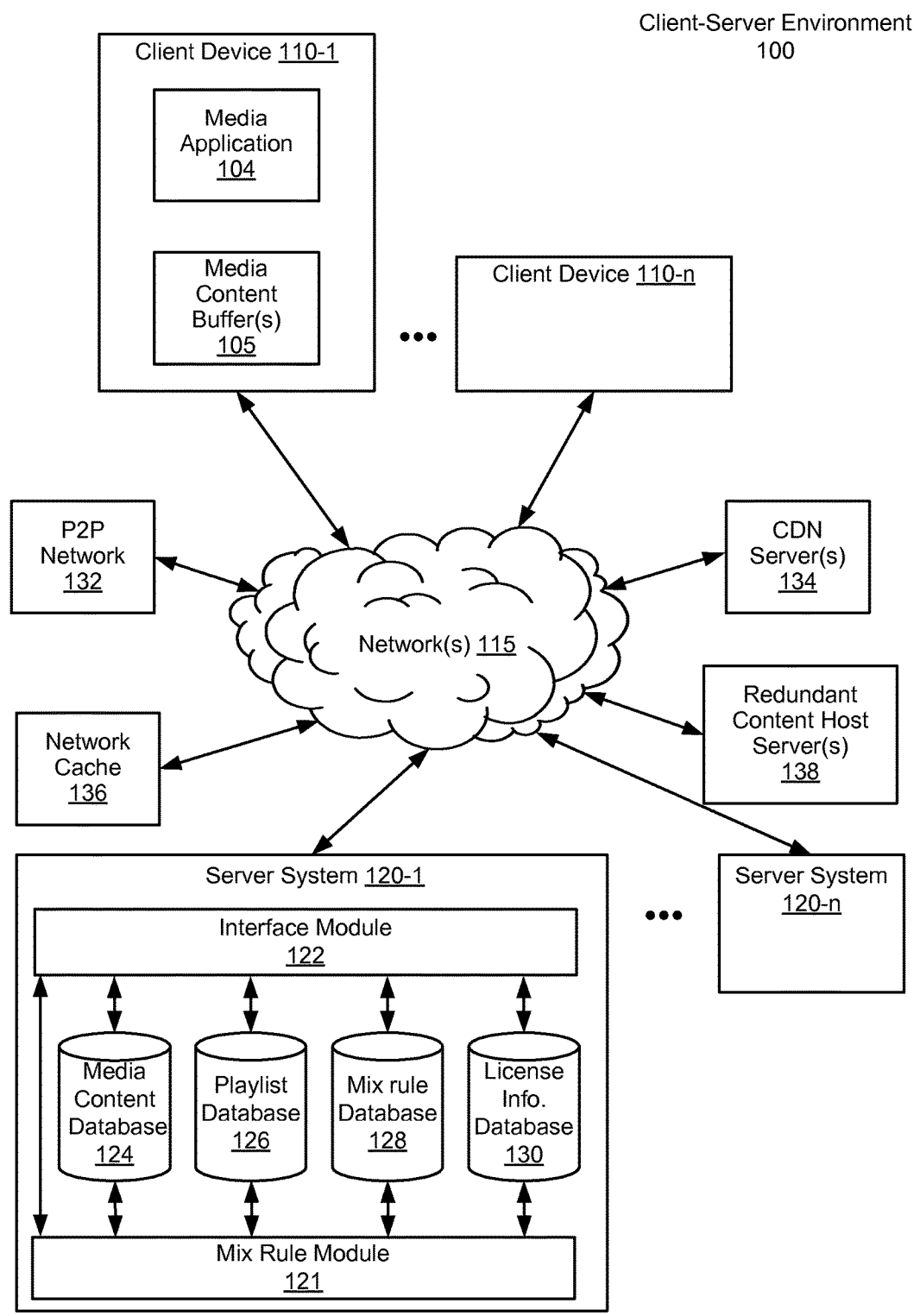
FIG. 1A is a block diagram illustrating a client-server environment in accordance with some implementations.

FIG. 1A is a block diagram of a client-server environment 100 in accordance with some implementations. The client-server environment 100 includes one or more client devices (110-1, . . . , 110-n) and one or more server systems (120-1, . . . , 120-n) that are connected through one or more networks 115. The client-server environment 100 also, optionally, includes a peer-to-peer (P2P) network 132 where clients share files with each other, one or more content delivery network (CDN) servers 134, a network cache 136, and one or more redundant content host servers 138 (e.g., media servers) connected to the one or more networks 115.

The client device 110-1 is a representative electronic device associated with a respective user. The server system 120-1 is a representative server associated with a media content provider with which users (and their electronic devices), optionally, have accounts that enable the users to access media content from one of server systems 120. The one or more networks 115 can be any network (or combination of networks) such as the Internet, other Wide Area Networks, Local Area Networks, Personal Area Networks, metropolitan area networks, VPNs, local peer-to-peer, ad-hoc connections, and so on.

In some implementations, the client device 110-1 is one of the group of: a personal computer, a mobile electronic device, a wearable computing device, a laptop, a tablet computer, a mobile phone, a digital media player, or any other electronic device able to prepare media content for presentation, control presentation of media content, and/or present media content. The client device 110-1 communicates with and receives content from content sources such as the server system 120-1, P2P network 132, CDN server(s) 134, network cache 135, and/or redundant content host server(s) 138.

In some implementations, the client device 110-1 includes a media content presentation and control application 104 (hereinafter "media application") that controls the presentation of media by the client device 110-1. For example, the media application 104 enables a user to navigate media content items, select media content items for playback, select media streams for playback, change currently displayed media streams, create and edit playlists, create mixes or remixes (or otherwise select effects to be added to) media content, and other such operations.

In some implementations, media content to be played back by a client device (e.g., client device 110-1) is stored by the client device (e.g., in a media content buffer 105 or a local cache).

In some implementations, media content to be played back by a client device is stored by a server system 120-1 (e.g., an origin server), which is located remotely from the client device 110-1.

In some implementations, media content to be played back by a client device is stored by one or more computing devices in a media delivery system 150, discussed in more detail with reference of FIG. 1B.

Data sent from the server system 120-1 (and/or one or more of the computing devices in a media delivery system 150) to the client device 110-1 can be stored/cached by the client device 110-1 in one or more media content buffers 105 (or a local cache) in the memory of the client device 110-1.

In some implementations, media content stored in the media content buffer(s) 105 is removed after the media content is presented by the client device 110-1, allowing new media content data to be stored in the media content buffer 105.

In some implementations, at least some of the media content stored in the media content buffer(s) 105 is retained for a predetermined amount of time after the content is presented by the client device 110-1 and/or until other predetermined conditions are satisfied.

The media content buffer 105 can also store media content from more than one media content stream. Storing data in a buffer while it is being moved from one place to another (e.g., temporarily storing compressed data received from a content source before it is processed by a codec and/or temporarily storing decompressed data generated by a codec before it is rendered by a renderer) is sometimes referred to as "buffering" data, and data stored in this way is sometimes referred to a "buffered" data. "Buffered" data is typically, but optionally, removed (or marked for deletion) from the buffer in which it was stored after it is transmitted from the buffer to its destination (e.g., a codec or a renderer), rather than being stored for later use.

In some implementations, when a user wants to playback media on the client device 110-1, the user interacts with the media application 104 to send a media control request to the server system 120-1. The server system 120-1 receives the media control request over the one or more networks 115. For example, the user is enabled to press a button on a touch screen of the client device 110-1 in order to send the media control request to the server system 120-1. As described below, a media control request is, for example, a request to begin presentation of media content by the client device 110-1. Though often used herein to describe requests to initiate or begin presentation of media by the client device 110-1, in some implementations, media control requests also include requests and/or signals to control other aspects of the media that is being presented on client device 110-1, including but not limited to commands to pause, skip, fast-forward, rewind, seek, adjust volume, change the order of items in a playlist, add or remove items from a playlist, adjust audio equalizer settings, change or set user settings or preferences, provide information about the currently presented content, begin presentation of a media stream, transition from a current media stream to another media stream, and the like.

The client-server environment 100 also includes a representative server system 120-1. In some implementations, the server system 120-1 includes an interface module 122, a mix rule module 121, a media content database 124, a playlist database 126, a mix rule database 128, and a license information database 130.

The interface module 122 enables the server system 120-1 to communicate with (e.g., send information to and/or receive information from) one or more of the client device 110-1, CDN server(s) 134, the network cache 136, redundant content host server(s) 138, and clients in a P2P Network 132. In some implementations, the interface module 122 receives media control request(s) from respective client devices (e.g., the client device 110-1). In response to receiving the media control request(s), the interface module 122 sends (e.g., streams) media content to the respective requesting client device.

In some implementations, the interface module 122 receives other information from client devices (e.g., the client device 110-1), such as mix information, playlists (e.g., containing multiple media content items and/or media content identifiers), mix rule or mix style selections, etc.

The mix rule module 121 extracts and/or analyzes mix information (e.g., from the playlist database 126), and creates and/or enables the creation of mix rules. In some implementations, the mix rule module 121 makes mix rules available to client devices (e.g., the client device 110-1) either directly and/or in conjunction with the interface module 122.

The media content database 124 stores media content that is configured to be provided to and presented by the client device 110-1 and/or provided to the CDN Servers 134, clients in a P2P Network 132, or other devices. For example, in some implementations, the media content database 124 stores audio (e.g., music, audio books, etc.), video (e.g., movies, television shows, etc.), images, or other media content that can be sent to (or streamed to) other client devices.

In some implementations, the media content database 124 includes data in different formats and file types to allow a variety of different devices and/or applications to receive content.

In some implementations, the data is stored in a single file format and/or container and is converted, transcribed, transcoded, and/or transmuxed to the appropriate data type or format before or as it is streamed to the client device 110-1. In other implementations, when the data is stored in a single file format, the data is converted, transcribed, transcoded, and/or transmuxed to the appropriate data type at the client device 110-1.

The playlist database 126 stores playlists of media content. Playlists are received at the server system 120-1 from client devices (e.g., via the interface module 122). In some implementations, playlists include identifiers of one or more media content items and playback information, including, but not limited to, mix and/or effect information associated with individual content items or multiple content items. For example, a playlist may include a list of song identifiers as well as values of parameters defining effects and settings to be applied during playback of one or more content items in the playlist. As a more specific example, a playlist may include identifiers of each song on Led Zeppelin's "Houses of the Holy" album, along with information that the transition between each song includes a five second crossfade duration and a reverb effect. As discussed herein, in some implementations, the server system 120-1 (e.g., with the mix rule module 121) extracts mix information from the playlists in the playlist database 126. Such information is used, for example, to create mix rules.

The mix rule database 128 stores mix rules and/or mix styles. As described herein, mix rules and/or mix styles may be created manually, automatically, or partially-automatically (e.g., using a combination of manually selected and crowdsourced mix information). In some implementations, mix rules are specific to a particular media content item (or multiple media content items) and are stored in the mix rule database 128 in association with an identifier of that content item. In some implementations, mix rules are not associated with any particular media content item(s), and are stored independently of any particular media content item or identifier thereof. Mix rules and/or mix styles from the mix rule database 128 are made available to client devices, for example, so that they can be applied to media content items for playback at the client devices. Mix rules and mix styles, as well as specific examples of mix rules and mix styles, are discussed herein with respect to FIGS. 4A-6.

The license information database 130 stores information regarding restrictions and/or permissions placed upon media content items based on the artists' and/or content owners' license agreements for those media content items. For example, the license information database 130 stores information indicating whether and to what extent a licensor permits users to modify (e.g., add effects to, mix, remix, sample, etc.) their content items.

Figure 1B:
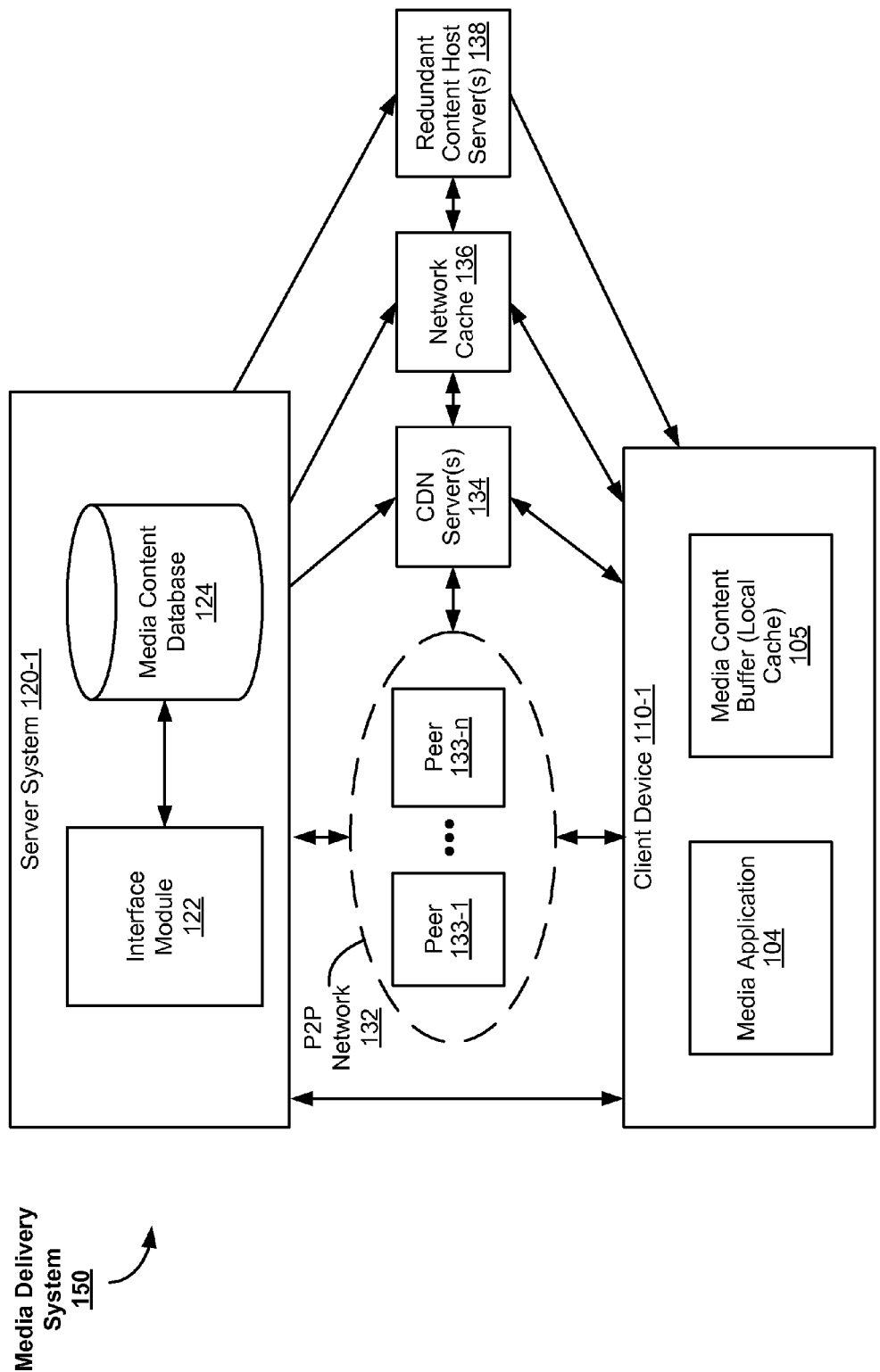
FIG. 1B is a block diagram illustrating a media delivery system in accordance with some implementations.

FIG. 1B is a block diagram of a media delivery system 150 in accordance with some implementations. In some implementations, the media delivery system 150 includes a plurality of computing devices including a client device 110-1 with a media content buffer 105 (or a local cache), one or more server systems 120 (sometimes also herein called origin servers) with a media delivery module 122 and a media content database 124, a peer-to-peer (P2P) network 132 including one or more peers (133-1, . . . , 133-n), one or more content delivery network (CDN) servers 134, a network cache 136, and one or more redundant content host servers 138. In some implementations, media content is stored at one or more of the computing devices in the media delivery system 150. For example, media content is initially stored in the media content database 124 of the server system 120-1 and subsequently disseminated/distributed to one or more peers 133 in the P2P network 132, one or more CDN servers 134, network cache 136, and/or one or more redundant content host servers 138 for access by the client device 110-1. In some implementations, each computing device within the media delivery system 150 can communicate with each other computing device within the system (e.g., via one or more networks, such as the network 115, FIG. 1A).

In some implementations, the client device 110-1 sends a media control request to the server system 120-1 for media content. In response to the request, the server system 120-1 (e.g., via the interface module 122) utilizes source information to instruct one or more of the computing devices in the media delivery system 150 to send the media content associated with the media control request to the client device 110-1, or sends relevant source information to the client device 110-1 that enables the client device 110-1 to request the media content associated with the media control request from a source (e.g., P2P network 132, CDN servers 134, network cache 136, or redundant content host servers 138). In some implementations, the client device 110-1 obtains media content associated with the media control request from the media content buffer 105 (or a local cache). In some implementations, the client device 110-1 utilizes locally stored source information to request or obtain media content associated with the media control request from one or more computing devices in the media delivery system 150 (e.g., directly from the server system 120-1 or from a peer 133-1 in the P2P network 132).

Figure 2:
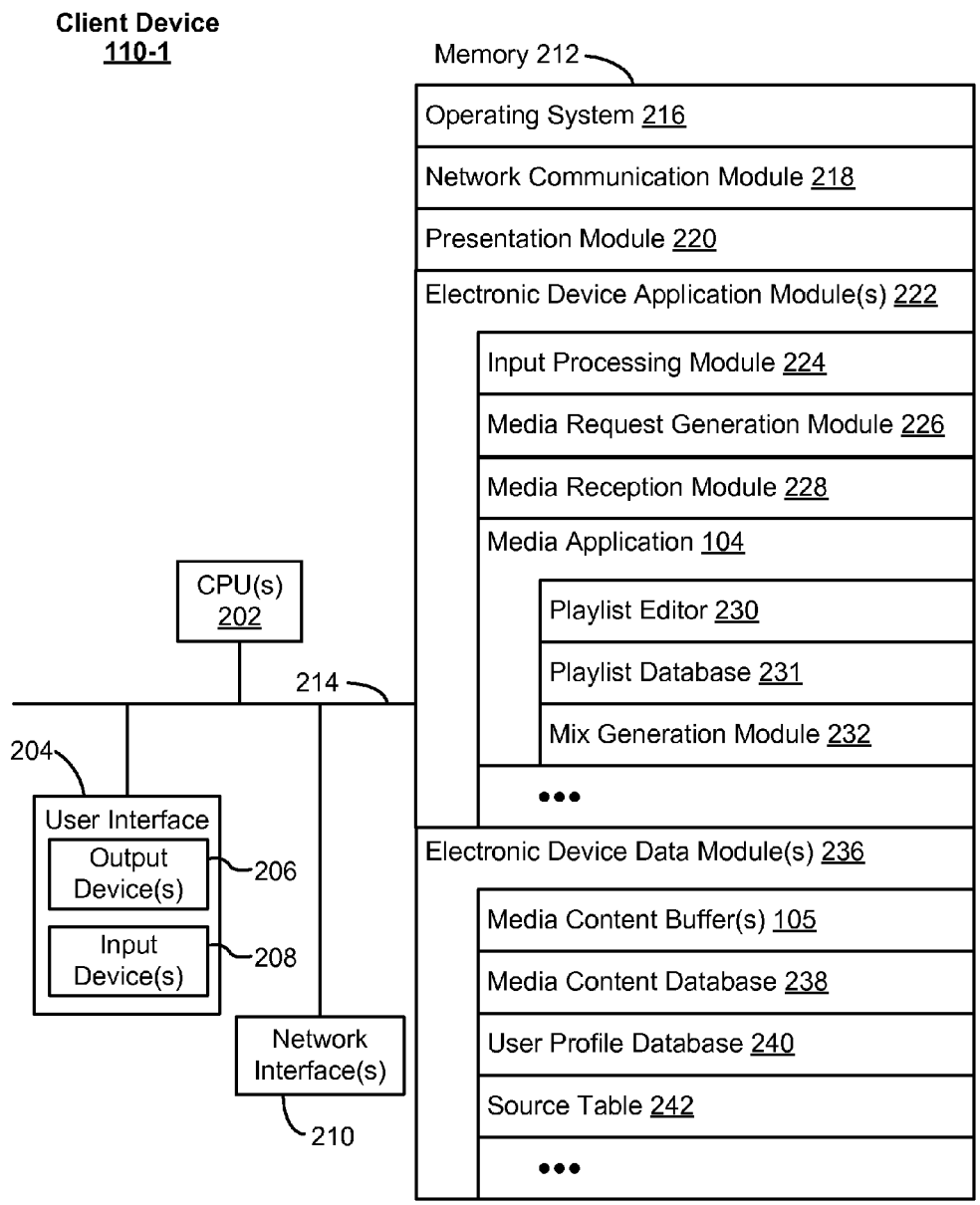
FIG. 2 is a block diagram illustrating a client device, in accordance with some implementations.

FIG. 2 is a block diagram illustrating a representative client device 110-1 in accordance with some implementations. The client device 110-1, typically, includes one or more processing units (CPUs) 202, one or more network interfaces 210, memory 212, and one or more communication buses 214 for interconnecting these components. The client device 110-1 includes a user interface 204. The user interface 204 includes one or more output devices 206, including user interface elements that enable the presentation of media content to a user, including via speakers or a visual. The user interface 204 also includes one or more input devices 208, including user interface components that facilitate user input such as a keyboard, a mouse, a voice-command input unit, a touch-sensitive display (sometimes also herein called a touch screen display), a touch-sensitive input pad, a gesture capturing camera, or other input buttons. In some implementations, the client device 110-1 is a wireless device, such as a mobile phone or a tablet computer.

Furthermore, in some implementations, the client device 110-1 uses a microphone and voice recognition or a camera and gesture recognition to supplement or replace the keyboard.

Memory 212 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 212, optionally, includes one or more storage devices remotely located from one or more CPUs 202. Memory 212, or, alternatively, the non-volatile memory device(s) within memory 212, includes a non-transitory computer readable storage medium. In some implementations, memory 212, or the computer readable storage medium of memory 212, stores the following programs, modules, and data structures, or a subset or superset thereof:

- an operating system 216 that includes procedures for handling various basic system services and for performing hardware dependent tasks;
- a network communication module 218 for connecting the client device 110-1 to other computing devices via the one or more communication network interfaces 210 (wired or wireless) connected to one or more networks 115 such as the Internet, other Wide Area Networks, Local Area Networks, Personal Area Networks, metropolitan area networks, VPNs, peer-to-peer, content delivery networks, ad-hoc connections, and so on;
- a presentation module 220 (e.g., a media player) for enabling presentation of media content at the client device 110-1 (e.g., rendering media content) through output devices 206 associated with the user interface 204 (e.g., a touch screen display, speakers, etc.);
- one or more electronic device application modules 222 for enabling the client device 110-1 to perform various functionalities, the one or more application modules 222 including but not limited to one or more of:
  - an input processing module 224 for receiving input from a user through the input device(s) 208 and interpreting the received input;
  - a media request generation module 226 for generating a request for media content based on input received by the input processing module 224;
  - a media reception module 228 for receiving media content (e.g., receiving a stream of media content) from a computing device in the media delivery system 150 (e.g., for receiving media content from a computing device that is remote from client device 110-1);
  - a media application 104 for processing media content (e.g., media content streams), for providing processed media content (e.g., at least one media content stream) to the presentation module 220 for transmittal to the one or more output device(s) 206, and for providing controls enabling a user to navigate, select for playback, and control media content, as well as select effects to be added to media content, generate mixes of content items, and otherwise select modifications to be applied to media content; the media application includes:
    - a playlist editor 230 that allows a user to create, edit, manage, share, and receive playlists of media content items, as well as: select effects to be applied to content items (e.g., flanger, reverb, delay/echo, etc.); generate mixes of content items (e.g., overlays of multiple content items or portions thereof, overlays of additional instruments or sounds, crossfades between content items, etc.); and select values of playback attributes (e.g., volume, equalizer settings, etc.);

a playlist database 231 that stores playlists of media content (e.g., lists of identifiers of media content items, as well as associated information such as playlist names, mix rules to be applied to tracks in the playlist, and the like); and a mix generation module 232 for receiving and/or accessing media content items (e.g., from the media delivery system 150) and applying effects to the content items (e.g., flanger, reverb, delay/echo, etc.), generating mixes of the content items (e.g., overlays of multiple content items or portions thereof, overlays of additional instruments or sounds, crossfades between content items, etc.), and adjusting playback attributes of the content items (e.g., volume, equalizer settings, etc.) based on user selections;

one or more electronic device data modules 236 for storing data, including, but not limited to one or more of:

a media content buffer(s) 105 (e.g., a local cache) for storing (e.g., temporarily) media content data from a computing device in the media delivery system 150 (e.g., a server system 120-1, a respective peer 133-1, or any other appropriate device);

a media content database 238 for storing, locally on the client device 110-1, media content as part of the user's personal media content library;

a user profile database 240 for storing account information associated with a user of the client device 110-1 such as user media history, user preferences, user interests, account credentials, and/or other such information; and a source table 242 for storing information indicating the location or address of computing devices (e.g., sources) in the media delivery system 150 storing respective segments or portions of media content and, optionally, information indicating which computing devices store which portions of media content.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212, optionally, stores a subset or superset of the modules and data structures identified above. Furthermore, memory 212, optionally, stores additional modules and data structures not described above.

Figure 3:
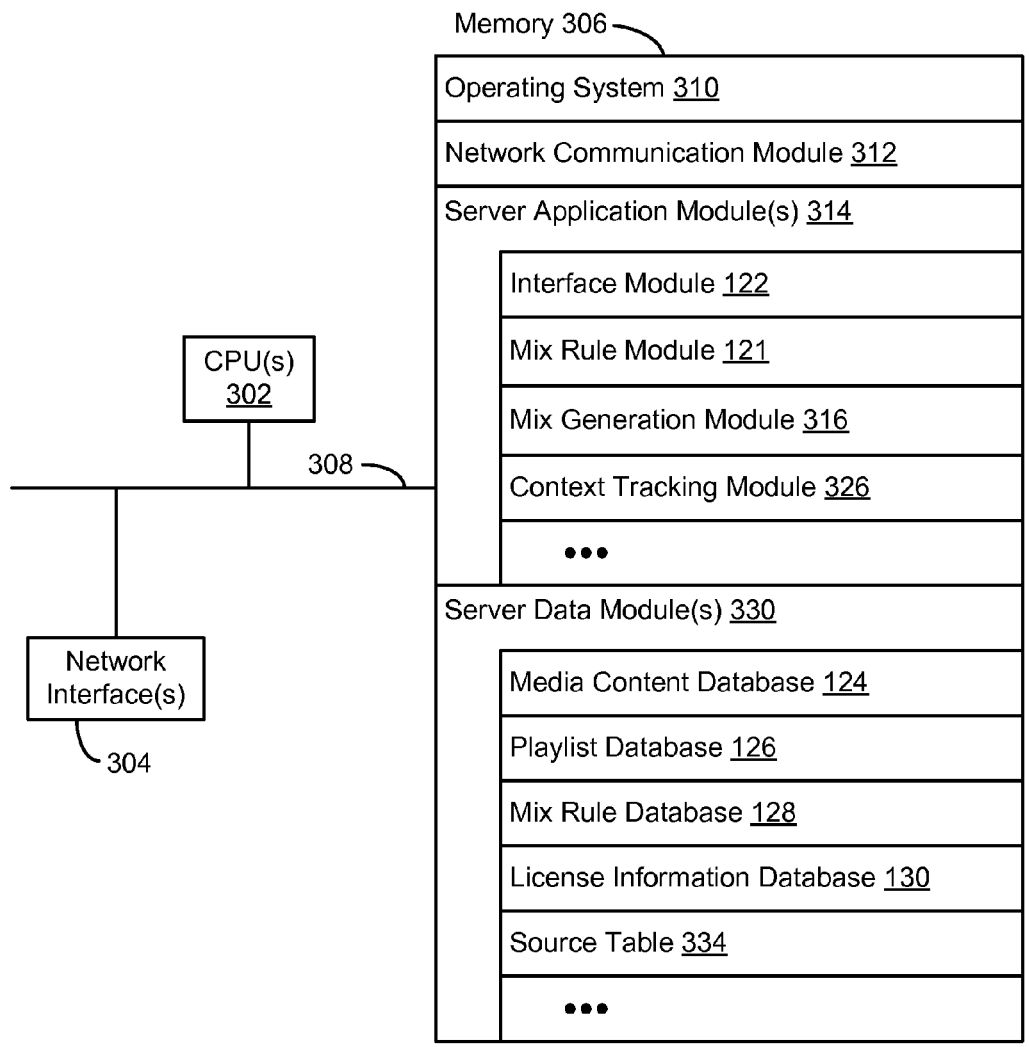
FIG. 3 is a block diagram illustrating a server system, in accordance with some implementations.

FIG. 3 is a block diagram illustrating a representative server system 120-1 (e.g., an origin server) in accordance with some implementations. The server system 120-1, typically, includes one or more processing units (CPUs) 302, one or more network interfaces 304, memory 306, and one or more communication buses 308 for interconnecting these components.

Memory 306 includes high-speed random access memory, such as DRAM, SRAM, DDR RAM, or other random access solid state memory devices; and, optionally, includes non-volatile memory, such as one or more magnetic disk storage devices, optical disk storage devices, flash memory devices, or other non-volatile solid state storage devices. Memory 306, optionally, includes one or more storage devices remotely located from one or more CPUs 302. Memory 306, or, alternatively, the non-volatile memory device(s) within memory 306, includes a non-transitory computer readable storage medium. In some implementations, memory 306, or the computer readable storage medium of memory 306, stores the following programs, modules and data structures, or a subset or superset thereof:

an operating system 310 that includes procedures for handling various basic system services and for performing hardware dependent tasks;

a network communication module 312 that is used for connecting the server system 120-1 to other computing devices via one or more communication network interfaces 304 (wired or wireless) connected to one or more networks 115 such as the Internet, other Wide Area Networks, Local Area Networks, Personal Area Networks, metropolitan area networks, VPNs, peer-to-peer, content delivery networks, ad-hoc connections, and so on;

one or more server application modules 314 for enabling the server system 120-1 to perform various functionalities, including but not limited to one or more of:

an interface module 122 for sending (e.g., streaming) media content to and receiving information from a client device (e.g., the client device 110-1) remote from the sever system 120-1; in various implementations, information received from the client device includes:

requests from client devices for media content (e.g., a request to stream media content);

playlists (e.g., lists of content items generated and/or saved by users); and user selections of mix rules and/or mix styles to be applied to media content;

a mix rule module 121 for extracting and/or analyzing mix information (e.g., stored in and/or extracted from the playlist database 126) and for creating and/or enabling the creation of mix rules and/or mix styles;

a mix generation module 316 for receiving and/or accessing media content items (e.g., from the media delivery system 150) and applying effects to the content items (e.g., flanger, reverb, delay/echo, etc.), generating mixes of the content items (e.g., overlays of multiple content items or portions thereof, overlays of additional instruments or sounds, crossfades between content items, etc.), and adjusting playback attributes of the content items (e.g., volume, equalizer settings, etc.) based on user selections, and providing the media content items to the interface module 122 for distribution to one or more client devices;

a context tracking module 326 for tracking and storing the context of a media content stream, optionally, including storing, among other data, one or more of the current playback position in a media content stream that is being presented by a client device (e.g., the client device 110-1), the position in a playlist, the play history of a user, the preferences of a user, previously skipped media content, whether media content items were "liked" or "disliked" (e.g., via "starred," "thumbs-up," and/or "thumbs-down" indications), and the like;

one or more server data modules 330 for storing data related to the server system 120-1, including but not limited to:
- a media content database 124 for storing media content and metadata describing the media content and enabling clients to search through the media content to identify media content;
- a playlist database 126 for storing playlists of media content (e.g., lists of identifiers of media content items, as well as associated information such as playlist names, mix information applied to tracks in playlists, and the like);
- a mix rule database 128 for storing mix rules and/or mix styles;
- a license information database 130 for storing information regarding restrictions and/or permissions placed upon media content items based on the artists' and/or content owners' license agreements; and
- a source table 334 for storing information indicating the location or address of sources in media delivery system 150 storing respective segments or portions of media content and, optionally, information indicating which computing devices store which portions of media content.

Each of the above identified elements may be stored in one or more of the previously mentioned memory devices, and corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 306, optionally, stores a subset or superset of the modules and data structures identified above. Furthermore, memory 306, optionally, stores additional modules and data structures not described above.

Although FIG. 3 shows the server system 120-1, FIG. 3 is intended more as a functional description of the various features that may be present in a set of servers than as a structural schematic of the implementations described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement server system 120-1, and how features are allocated among them, will vary from one implementation to another and, optionally, depends in part on the amount of data traffic that the system must handle during peak usage periods as well as during average usage periods.

As noted above, in some implementations, a playlist editor or other appropriate user interface of a media application (e.g., the media application 104) provides controls that enable a user to create their own mix rules. The specific controls that are offered depend on the type of effects and the degree of control that are to be afforded to the user. Several examples of controls are described below with reference to particular types of mix effects and/or playback modifications that are possible in various implementations.

Figure 4A:
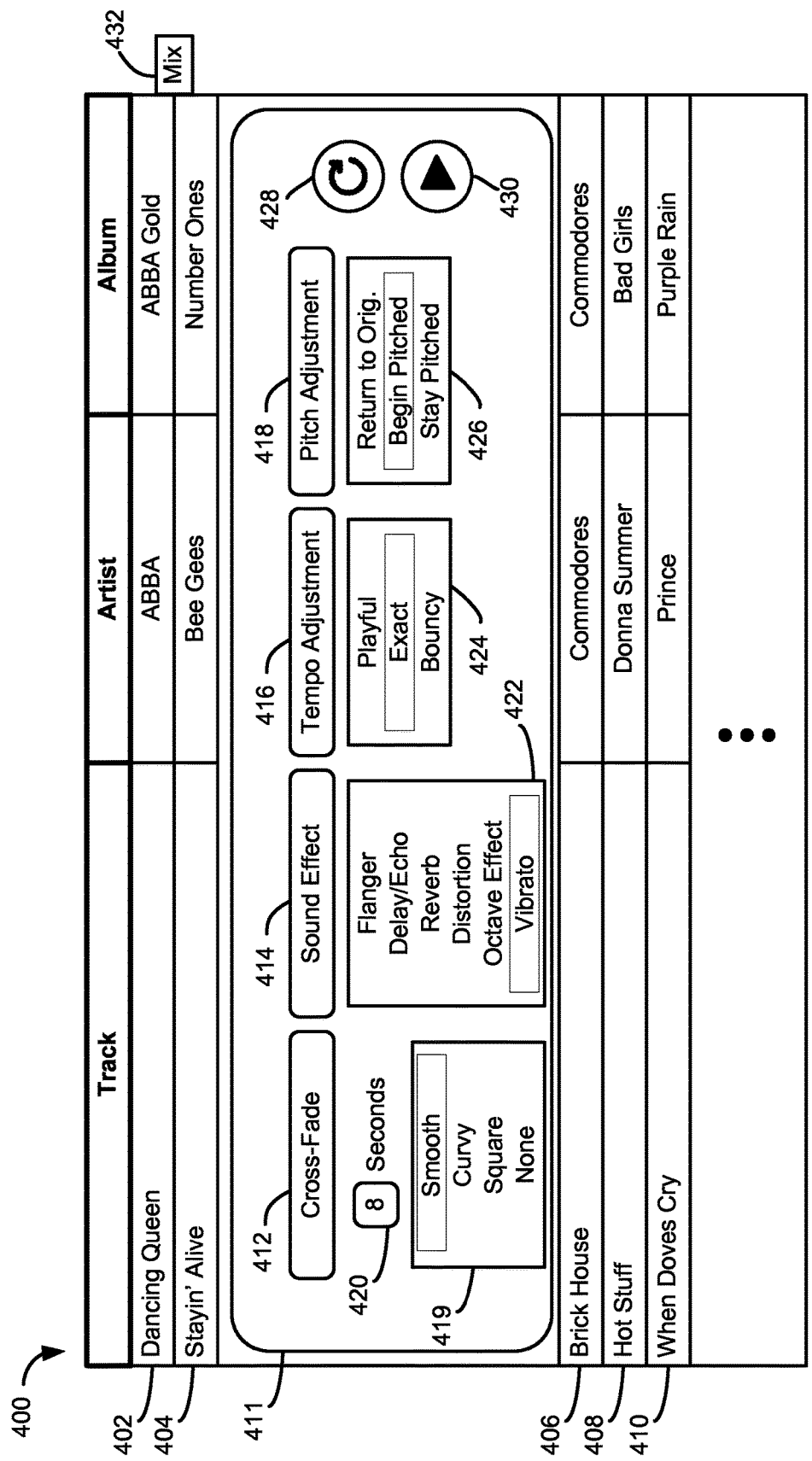
FIGS. 4A-4E are illustrations of exemplary user interfaces for mixing media content items, in accordance with some implementations.

FIG. 4A illustrates a playlist editor that includes controls for adding effects to and/or otherwise modifying playback parameters of songs, according to some implementations. (For simplicity, the present discussion refers to "tracks" or "songs"; however, it will be understood that the ideas presented herein relate to any appropriate media content items, including any audio, video, or other multimedia content.)

The user interface 400 includes a listing of a plurality of tracks (tracks 402, 404, 406, 408, and 410) corresponding to an exemplary playlist. A mixing interface 411 is displayed between tracks 404 and tracks 406, and includes controls for specifying aspects of a crossfade mix effect between tracks 404 and 406.

In some implementations, tracks in the playlist separate to create a gap in which the mixing interface 411 is displayed without obscuring any of the tracks in the playlist. As described herein, in some implementations, the mixing interface 411 appears in response to a user selection of a "mix" control that appears at a location representing a transition between two tracks. For example, mix control 432 illustrates one example of a control that causes a mixing interface (e.g., the mixing interface 411) to appear. In the case of mix control 432, tracks 402 and 404 would separate to create a gap in which the mixing interface is displayed.

In some implementations, the mixing interface 411 includes a crossfade control 412. When selected, the crossfade control 412 causes track 404 to crossfade into track 406 during playback of the playlist.

In some implementations, the mixing interface 411 includes a duration control 420 and a crossfade curve control 419.

In some implementations, the duration control 420 and the curve control 419 are displayed if the crossfade control 412 has been selected, and are not displayed if the crossfade control 412 has not been selected. For example, the duration control 420 and the curve control 419 appear in response to a selection of the crossfade control 412. In other implementations, these controls are displayed in the mixing interface 411 regardless of whether the crossfade control 412 has been selected.

The duration control 420 allows a user to select the duration of the crossfade between the selected tracks.

In some implementations, the duration control 420 is a text input field, such that a user can type or otherwise directly set a number value.

In some implementations, the duration control 420 includes a number of predefined values from which the user can select (e.g., presented to the user in a dropdown menu).

The crossfade curve control 419 allows a user to select a volume curve to be applied during the crossfade between the selected tracks. In some implementations, volume curves are based on mathematical curves defining the change in volume over time of the tracks. For example, volume curves may be linear, cosine, or square, each representing a different volume increase/decrease profile for the selected tracks.

In some implementations, the volume curves are identified in the mixing interface 411 with less technical terms, such as "smooth" (for linear), "curvy" (for cosine), "sharp" (for square), and "none" (indicating that no volume fading of either track should occur during the transition). As shown in FIG. 4, the "smooth" volume curve has been selected (as indicated by the box enclosing the word).

In some implementations, if no crossfade duration is selected, track 404 will not overlap with track 406, but will instead proceed with a predetermined track pause duration (or no track pause).

In some implementations, even if no crossfade duration is selected, and hence the tracks do not overlap, a selected volume curve is still applied to one or both of tracks 404 and 406. For example, the ending of track 404 will fade-out according to a "curvy" volume curve, and subsequently, the beginning of track 406 will fade in according to the "curvy" volume curve.

In some implementations, the mixing interface 411 includes a sound effect control 414. When selected, the sound effect control 414 causes one or more selected sound effects to be applied to the playback of track 404 and/or track 406 during the crossfade between the two tracks.

The effect selection control 422 allows a user to select particular sound effects to be applied during the crossfade. For example, the effect selection control 422 includes several exemplary sound effects, including flanger, delay/echo, reverb, distortion, octave effect, and vibrato. As shown in FIG. 4A, the "vibrato" effect has been selected. In some implementations, multiple effects may be selected for simultaneous application.

In some implementations, users can specify values for effect parameters associated with the selected effects. For example, once the "vibrato" effect has been selected, the mixing interface 411 (or another appropriate interface) allows the user to specify "speed" and "intensity" values for the vibrato effect.

In some implementations, the effect selection control 422 is displayed if the sound effect control 414 has been selected, and is not displayed if the sound effect control 414 has not been selected. For example, the effect selection control 422 appears in response to a selection of the sound effect control 414. In other implementations, the effect selection control 422 is displayed in the mixing interface 411 regardless of whether the sound effect control 414 has been selected.

In some implementations, the mixing interface 411 includes a tempo adjustment control 416. When selected, the tempo adjustment control 416 causes one or more selected tempo adjustments to be applied to the playback of track 404 and/or track 406 during the crossfade between the two tracks. Tempo adjustments change the tempo of a track to which it is applied, and may or may not result in a change of pitch. For example, the tempo of track 404 may be increased during the transition to track 406 (e.g., during the end of track 404) in order to match the faster tempo of track 406. Tempo adjustments can be applied to one or both of the tracks during a transition.

The tempo curve selection control 424 allows a user to select a particular tempo adjustment curve to be applied during the transition. For example, the tempo curve selection control 424 displays options for "playful," "exact," or "bouncy" tempo curves.

In some implementations, the tempo adjustment causes a different respective tempo adjustment to be applied to each of tracks 404 and 406. For example, in one such implementation, during the transition period between tracks 404 and 406, the tempo of track 404 is increased while the tempo of track 406 is decreased, such that the tempos match during all or part of the transition period. After the transition period (e.g., once track 404 has ceased to be played back), the tempo of track 406 is returned to its normal rate.

In some implementations, the curve selection control 424 is displayed if the tempo adjustment control 416 has been selected, and is not displayed if the tempo adjustment control 416 has not been selected. For example, the curve selection control 424 appears in response to a selection of the tempo adjustment control 416. In other implementations, the curve selection control 424 is displayed in the mixing interface 411 regardless of whether the tempo adjustment control 416 has been selected.

In some implementations, the mixing interface 411 includes a pitch adjustment control 418. When selected, the pitch adjustment control 418 causes one or more selected pitch adjustments to be applied to the playback of track 404 and/or track 406 during the crossfade. Pitch adjustments change the pitch of one or both of the tracks, and may or may not result in a change of tempo. Such adjustments allow users to shift the musical key of one or both tracks during a transition, and can provide smoother transitions between tracks. For example, the pitch of track 406 may be shifted so that it is "in key" with track 404 during the crossfade, which may produce a less discordant sounding transition between the two tracks.

The pitch curve selection control 426 allows a user to select a particular pitch adjustment curve to be applied during the transition. For example, the pitch curve selection control 426 displays options for "return to original," "begin pitched," and "stay pitched."

In some implementations, the pitch curve selection control 426 is displayed if the pitch adjustment control 418 has been selected, and is not displayed if the pitch adjustment control 418 has not been selected. For example, the pitch curve selection control 426 appears in response to a selection of the pitch adjustment control 418. In other implementations, the pitch curve selection control 426 is displayed in the mixing interface 411 regardless of whether the pitch adjustment control 418 has been selected.

In some implementations, the mixing interface 411 includes a preview control 430 and a repeat control 428. The preview control 430, when selected, causes all or a portion of the transition (e.g., a preview of the transition) to be played back, with all of the currently selected effects and/or playback adjustments applied. Accordingly, the user can hear how the transition will sound based on the current selections, and adjust the selections if desired.

In some implementations, changes made to the effects and/or playback parameters while a preview is being played back are applied during that preview (i.e., without waiting until the preview ends). In other implementations, changes are applied during a next preview.

In some implementations, when the preview control 430 is selected (e.g., a click and release, press and release, double click, etc.), the preview is played back in its entirety (or until the preview is terminated by the user, e.g., by selecting a "stop" control, not shown, or by selecting the mix control 432).

In some implementations, the preview is played back as long as the user maintains a selection of the preview control 430 (e.g., for the hold duration of a press-and-hold or click-and-hold selection, or while a cursor is positioned within a boundary of the preview control 430).

In some implementations, both of the above described playback functionalities can be invoked, depending on the characteristics of the selection. For example, in some implementations, in response to a first type of input (e.g., click-and-release, press-and-release, double-click, double-tap, etc.), the preview is played back in its entirety (or until the playback is terminated by the user). In response to a second type of input (e.g., a click-and-hold, press-and-hold, cursor "hover," etc.), the preview is played back only during the duration of the selection.

The repeat control 428, when selected, causes the playback of the preview to be repeated (i.e., "looped") indefinitely (or n times, where n is any appropriate value, which may be user selected), until the user terminates the preview (e.g., by unselecting the preview control 430 and/or the repeat control 428, or by selecting a "stop" control, not shown). In some implementations, the repeat control does not cause playback of a preview to begin; rather, the state of the repeat control 428 determines whether the preview will be repeated in response to the preview control 430 being selected.

In some implementations, the controls 412, 414, 416, 418, and 428 are "toggle" buttons, such that they toggle the associated mix rule and/or playback parameter "on" or "off." In some implementations, the controls themselves have a first appearance when they are "on" and a second distinct appearance when they are "off." For example, they may appear one color to indicate "on" and another distinct color to indicate "off."

Any of the effects and/or playback parameter adjustments described herein with respect to FIG. 4A can be applied to any track or portion of a track. In particular, while the effects and/or playback parameter adjustments were discussed in relation to a transition between two content items (i.e., a crossfade), they can be applied to single content items outside the context of a transition as well. For example, a "vibrato" effect can be applied to a middle portion of a single song. Thus, this effect is not part of a crossfade between two songs, but rather is simply an effect that is applied to one song. In such implementations, appropriate user interfaces and controls are provided to allow the user to select the effects and/or values of the playback parameters that are to be applied to that content item, as well as where within a song those effects and/or values are to be applied (e.g., so the user can identify the particular portion of the song to which the modification should be applied). As a specific example, a user may wish to apply the vibrato effect to a song each time the chorus repeats. User interfaces (e.g., slider bars, start/stop time input fields, etc.) are provided to allow the user to identify those portions of a track to which the modifications are to apply.

Moreover, in various implementations, other effects and/or playback adjustments can be selected and configured in the mixing interface 411. For example, in some implementations, the mixing interface 411 includes controls for adjusting equalizer filters (e.g., bass, middle, treble), playback volume, etc. Moreover, additional controls may be provided to allow more (or more intricate) control of effects and/or playback parameters. For example, in some implementations, different crossfade effects can be specified, such as asymmetrical volume levels (e.g., so that a first track is allowed to end without any "fade out," while a subsequent track fades in, either with or without any overlapping portion of the tracks).

As noted above, effects and/or playback parameter adjustments made using the mixing interface 411 are stored in association with a playlist. For example, the playlist shown in FIG. 4A is stored in one or both of the playlist database 231 of the client device 110-1 and the playlist database 126 of the server system 120-1.

In some implementations, effects, as well as parameter values that govern the effects, are identified by unique numbers (or any other appropriate identifier), and stored in association with the playlist as a coded entry. In an exemplary coded entry, the effect is identified first, followed by parameter values that govern the effect, the entry taking the form {Effect ID: Parameter Value 1, . . . , Parameter Value n}. For example, a vibrato sound effect (having an effect ID of "1") having a selected speed of "5" and an intensity of "2" would be stored in a playlist database as {1:5, 2}. As another example, a crossfade effect (having the effect ID "7") having a selected duration of 8 seconds and a volume curve "smooth" (corresponding to the parameter value "1") would be stored in a playlist database as {7:8, 1}. Any effect (e.g., sound effect, crossfade effect, tempo adjustment, pitch adjustment, etc.) can be represented in this manner.

The coded entries for each effect are stored in association with identifiers of the particular track or tracks to which they are to be applied. For example, an effect that is selected for application to a single song is stored in association with an identifier of that song (e.g., in the mix rule database 128 and/or the media content database 124 of the server system 120-1). An effect that is selected for application to multiple songs (e.g., during a transition between the songs) will be stored in association with identifiers of those two songs. In some implementations, song transitions in a playlist are uniquely identifiable, such that effects to be applied during the transition are associated with the transition, rather than the songs individually.

In some implementations, instead of storing coded entries for each effect in association with the track(s) to which they apply, playlists include and/or are associated with metadata that specifies what effects are to be applied to what tracks. This metadata is then accessed prior to or during playback of the playlist, and the effects are applied to the content items when appropriate.

Effects and/or playback parameter adjustments are applied to tracks in various ways. For example, in some implementations, a client device (e.g., the client device 110-1) receives and/or otherwise accesses media content identified in the playlist, and applies (e.g., with the mix generation module 232) the selected effects and/or playback parameter adjustments to the media content.

In some implementations, a server computer (e.g., the server system 120-1, or any other appropriate computing device in the media delivery system 150) receives and/or otherwise accesses media content identified in the playlist, and applies (e.g., with the mix generation module 316) the selected effects and/or playback parameter adjustments to the media content. The server computer then streams or otherwise provides the adjusted media content to one or more clients (e.g., the client device 110-1).

In some implementations, the audio processing that generates the playback of the content items in accordance with the selected effects is performed in a just-in-time manner, such that the audio data for the adjusted content item(s) is generated only a short time before playback. (The audio processing capabilities of the client device 110-1 may determine how far in advance of playback the processing should occur in order to avoid lags, delays, or other undesirable effects.)

In some implementations, the audio processing is performed further in advance of playback. For example, the audio data is generated shortly after an effect or adjustment has been selected for one or more content items (e.g., when a playlist with mix rules is stored, or when mix rules to be applied to one or more content items has been created), before the playlist is selected for playback. The previously generated audio data is then accessed at a later time (e.g., when the user is listening to the playlist).

As another example, the audio data is generated once a playlist that includes one or more mix rules is selected for playback. Specifically, when a user selects a playlist for playback, the audio data for content items to which effects are to be applied is generated for all or part of the playlist in advance of playback of those particular items. The audio data is then stored and retrieved when needed for playback.

Figure 4B:
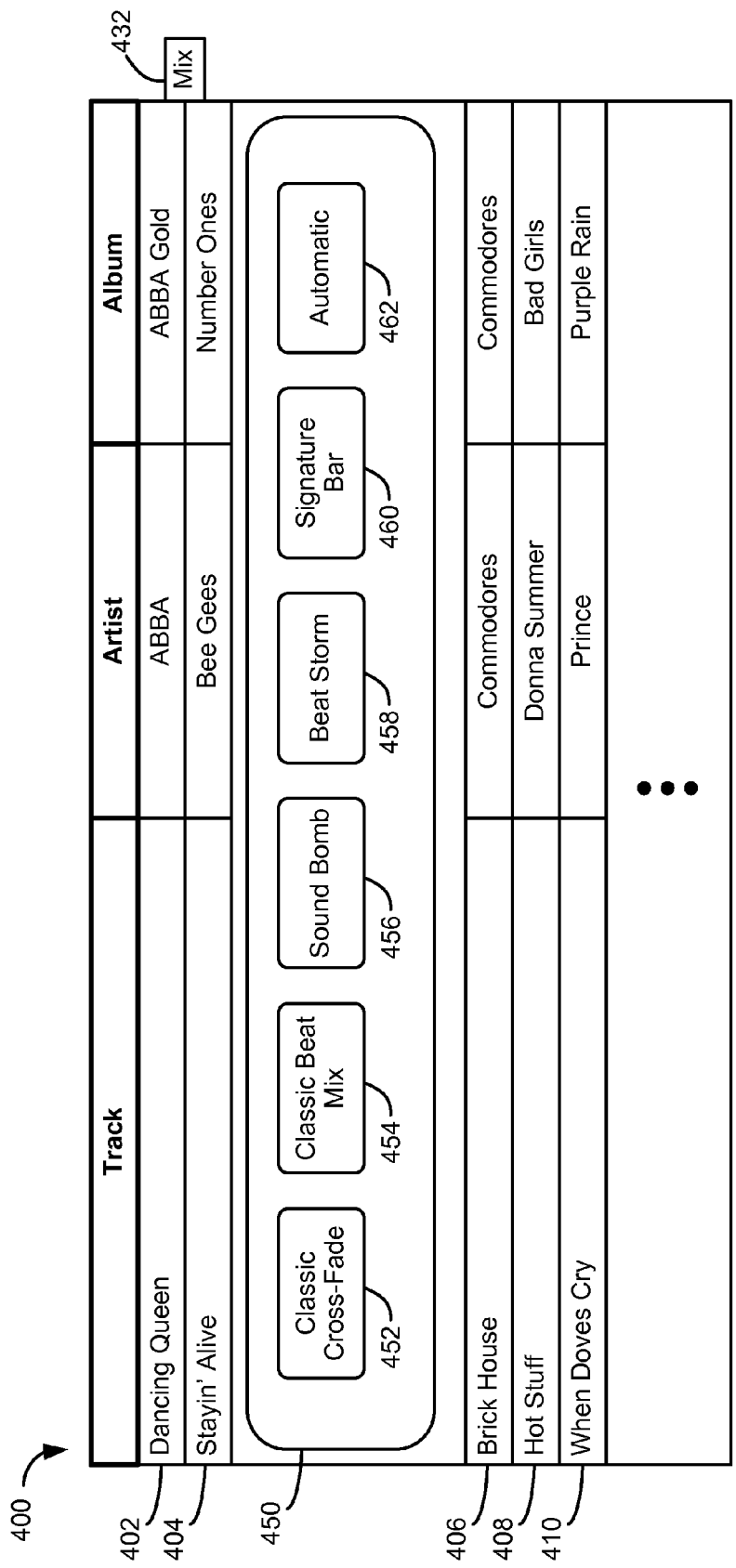

As discussed above, FIG. 4A illustrates a mixing interface 411 that provides controls for adding effects and adjusting playback parameters of media content. In some cases, however, simpler and/or fewer controls are offered. For example, FIG. 4B illustrates the playlist editor 400 with a mixing interface 450. Instead of providing controls to allow the user to select and manipulate specific effects and their parameter values, the mixing interface 450 provides controls to select one or more predefined mix styles. The mix style controls include mix style controls 452, 454, 456, 458, 460, and 462.

As noted above, mix styles are predefined sets of one or more mix rules. In some implementations, the streaming media service provides the mix styles, which are then selected by the user for application to one or more tracks. In some implementations, as discussed below, mix styles use crowdsourced information when determining or setting the values of particular parameters. Crowdsourced information may be used in the process of creating the mix style, or at the time the mix style is selected by a user for application to one or more tracks, as discussed herein.

The mix styles shown in the mixing interface 450 are configured to cause the following playback behaviors. These mix styles are merely exemplary, as are their titles. Other mix styles may also be presented.

"Classic crossfade" 452: do not match tempos, perform only a linear volume crossfade.

"Classic beat mix" 454: match the tempos of the two tracks with a linear volume crossfade.

"Sound Bomb" 456: match the tempos of the two tracks with fast fade of bass frequencies in the middle third of the crossfade.

"Beat Storm" 458: match the tempos of the two tracks with fast fade of bass frequencies in the middle third of the crossfade with a delay-echo doubling the bass drums in the first third of the crossfade.

"Signature Bar" 460: match the tempos of the two tracks with bass and middle frequencies fading out over the entire crossfade, add a flanger effect during the middle third and the last third of the crossfade, and the target song fades in quickly.

"Automatic" 462: select mix rules based on the particular tracks that are selected using crowdsourced information.

When a mix style control is selected (e.g., by clicking, touching, pressing, etc.), the one or more mix rules specified by the selected mix style are associated with one or more tracks, as described herein with respect to FIG. 4A.

Figure 4C:
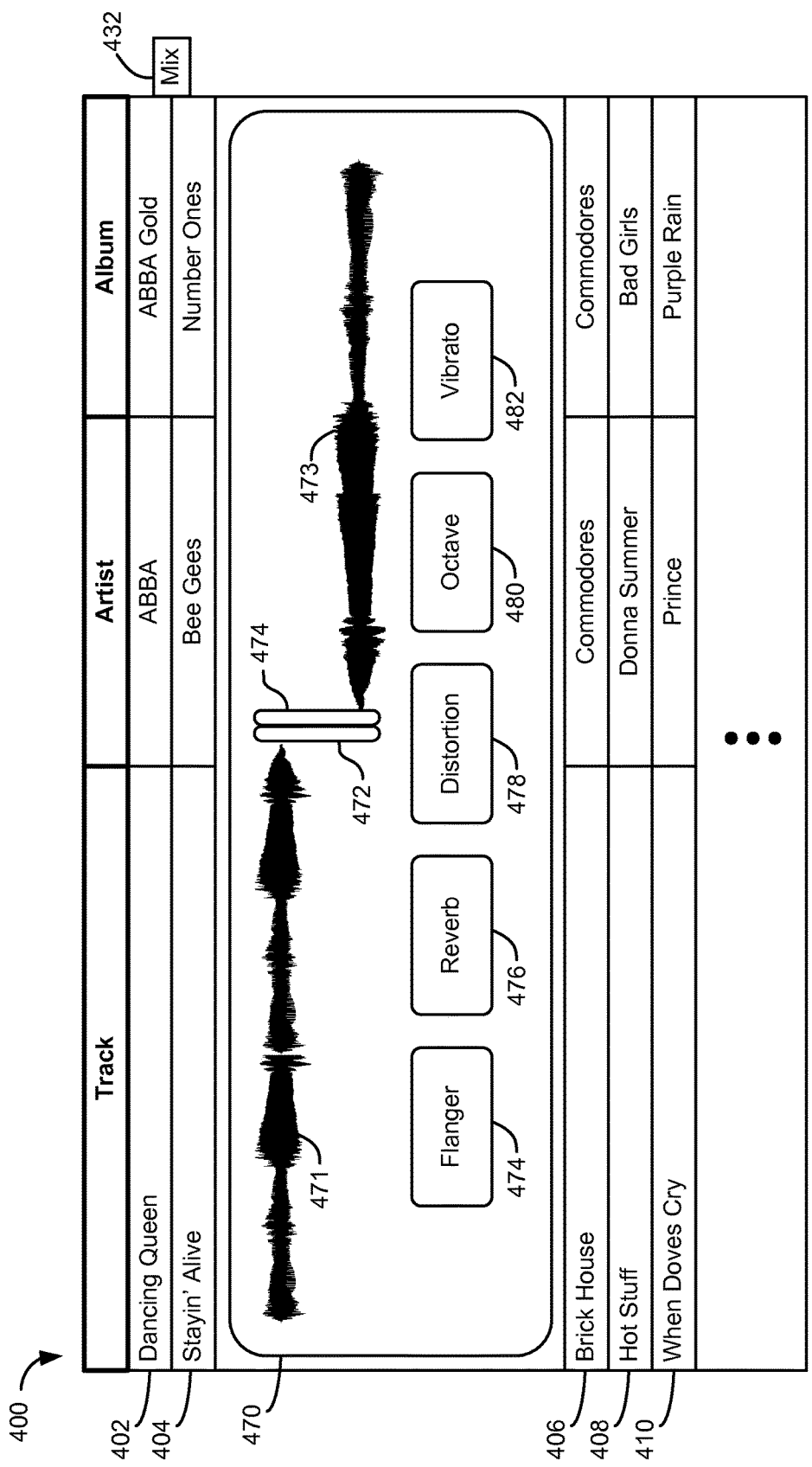

Other controls can also be provided, according to some implementations. For example, FIG. 4C illustrates the playlist editor 400 with a mixing interface 470. The mixing interface 470 provides endpoint controls (first endpoint control 472 and second endpoint control 474) with which a user can select transition points for the tracks to which a crossfade effect is to be applied. In some implementations, the mixing interface 470 also displays graphical representations of the tracks to which the crossfade is to be applied (e.g., first waveform 471 and second waveform 473). In some implementations, the graphical representations are waveforms, which may or may not represent the actual waveform of the selected track.

In some implementations, the mixing interface 470 also includes effect controls that, when selected by a user, cause a corresponding effect to be applied to the selected tracks during the crossfade. For example, FIG. 4C illustrates a flanger effect control 474, a reverb effect control 476, a distortion effect control 478, an octave effect control 480, and a vibrato effect control 482. These effects are merely exemplary, and more, fewer, or different effects and/or effect controls are provided in various implementations.

The endpoint controls 472, 474 allow users to specify when, within the selected tracks, a crossfade will begin and end. Specifically, the location of first endpoint control 472 specifies when, during the playback of one or both of the selected tracks, the crossfade transition will begin. The location of the second endpoint control 474 specifies when, within playback of one or both of the selected tracks, the crossfade transition will end.

Figure 4D:
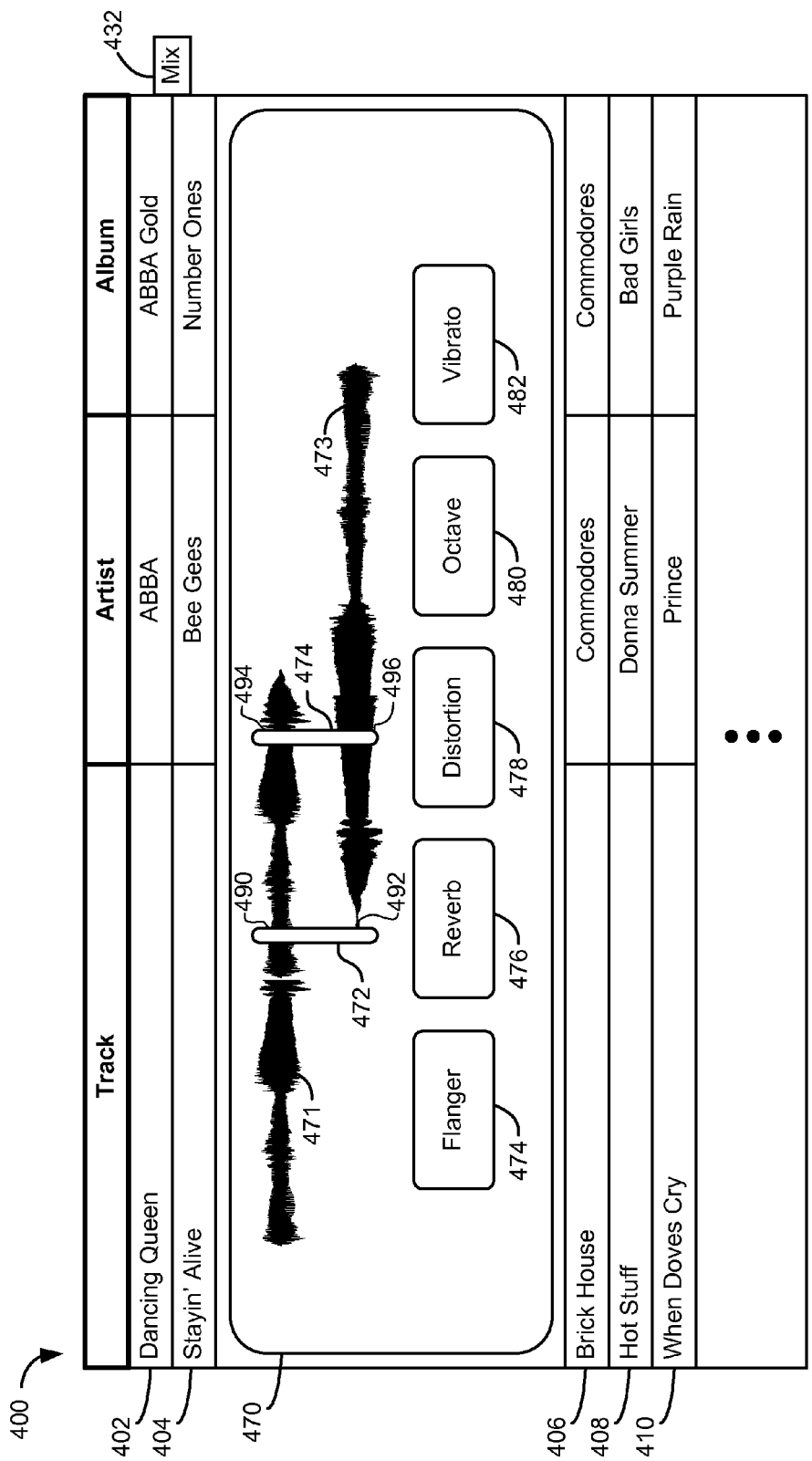

FIG. 4D illustrates the mixing interface 470 after a user has moved the first and second endpoint controls 472, 474 to particular locations relative to the waveforms 471, 473. In this example, the crossfade duration (i.e., the time between the first endpoint control 472 and the second endpoint control 474) begins at a first point within the first track, and ends at a second point within the first track. During playback of the playlist in which the transition between the selected tracks will be played back, the tracks will be played back in accordance with the selections made in the mixing interface 470, including the application of any selected crossfade effects.

In some implementations, during the crossfade duration, the first track begins to fade out and the second track begins to fade in at the playback location specified in each track by the first endpoint control 472. For example, the particular selection shown in FIG. 4D results in the first track (track 404) beginning to fade out at a point prior to the end of the track (point 490), while the second track (track 406) will begin to fade in at the beginning of the track (point 492). The first track continues to fade out until the playback location specified by the second endpoint control 474 is reached (point 494), at which point it is inaudible (e.g., at zero volume and/or no longer being played back). Similarly, the second track fades in until the playback location specified by the second endpoint control 474 is reached (point 496), at which point it will be fully audible (e.g., at the selected playback volume of the device and/or media application). In some implementations, the fading in and out of the tracks is governed by one or more of the volume curves described herein.

As shown in FIG. 4D, the second endpoint control 474 is positioned before the natural end of the first track, indicating that the portion of the first track falling on the right side of the control 474 will be cropped (e.g., not played). However, a user can select other locations for the endpoint controls 472, 474. For example, the second endpoint control 474 can be positioned at the end of the first track (e.g., at the end of the waveform 471), such that the end of the first track is not cropped during playback.

Figure 4E:
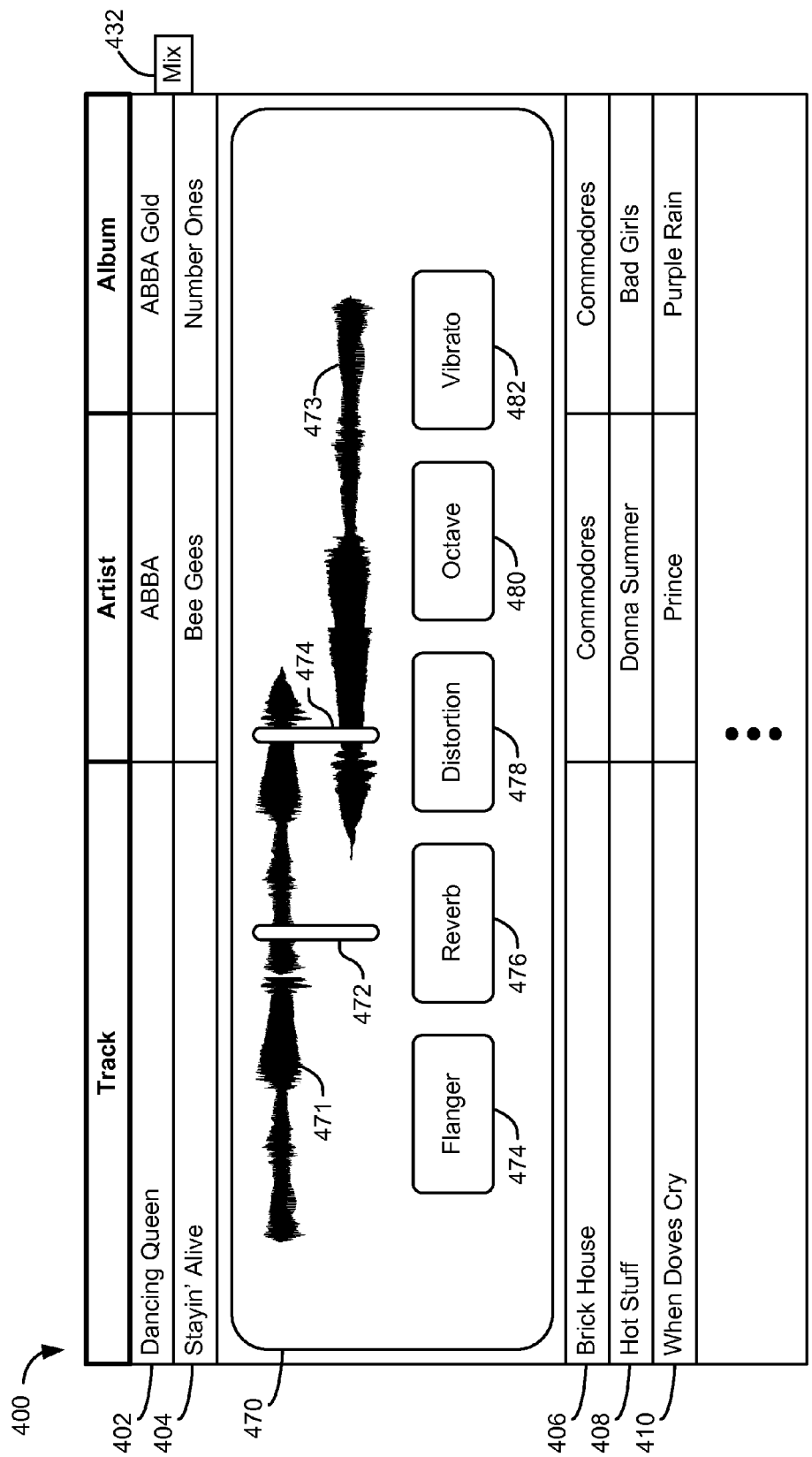

FIG. 4E illustrates another example of how the endpoint controls 472, 474 and the waveforms 471, 473 may be oriented in order to produce a certain crossfade effect. In this case, the second waveform 473 is positioned such that it will not begin to fade in until after the crossfade duration has begun (i.e., after the first track has begun to fade out, as specified by the location of endpoint control 472). Accordingly, the first track (track 404) will begin to decrease in volume, even though playback of the second track (track 406) has not yet begun. Once the playback position at which playback of the second track (track 406) begins (e.g., approximately in the middle of the crossfade duration), it will fade in according to an appropriate volume curve until it is at full volume and the first track has ceased to be played back.

In some implementations, both the endpoint controls 472, 474 and the waveforms 471, 473 are moveable by a user. For example, they may be moved by dragging or swiping (e.g., with a finger, mouse, stylus, or other pointing tool), keyboard input (e.g., arrow keys), or any other appropriate technique. Accordingly, users can create many unique and interesting crossfades to suit the particular properties of the songs, personal artistic preferences, and the like.

The mixing interfaces 411, 450, and 470 are illustrated separately in FIGS. 4A-4E. However, these interfaces, and/or the controls discussed with respect to these interfaces, may be combined in any manner, including any subsets or supersets thereof. For example, all of the controls in the mixing interfaces 411, 450, and 470 are, in some implementations, included in a single mixing interface. In some implementations, controls not shown or described are included in a mixing interface, while in other implementations, controls shown or described are not included in a mixing interface.

In some implementations, mix rules and/or mix styles are based on and/or incorporate crowdsourced mix information. As described herein, crowdsourced mix information can include various different types of information related to user-generated mixes of media content, and can be used to create and/or modify mix rules or mix styles in various different ways.

In order to leverage user-generated mix information for crowdsourcing mix rules or mix styles, the streaming service receives and/or stores mix information from various users. In some implementations, the streaming service extracts and/or accesses mix information from playlists that are stored in a playlist database (e.g., the playlist database 126). In some implementations, the playlist database 126 stores user-generated playlists that include specifications for the mixes that were generated by a user for that playlist. Accordingly, the streaming service (e.g., using the server system 120-1) has access to the user-generated mix information for various purposes, such as creating and/or modifying mix rules and/or mix styles.

Mix information includes any and all parameters and values that are used to create mixes. For example, as noted above, effects can be represented by effect identifiers and accompanied with values of parameters that govern the effect. Such identifiers and parameter values are stored in association with the tracks to which they are applied. As another example, playback locations associated with crossfade effects are also stored in association with the tracks to which they are applied. Specifically, in some implementations, the selected playback locations at which the tracks fade in or out, or whether and where they are cropped, are stored in association with each track. Mix information is stored (in association with the tracks to which they are applied) in any appropriate location or manner, such as in the playlist database 126, or a separate mix information database (not shown).

FIG. 5A illustrates an exemplary table 500 that includes mix information from various users for a particular track. Each row in table 500 represents user-generated mix information for the same song (in this example, "Stayin' Alive"). In some implementations, table 500 represents a portion of (or data from) a larger table or database, such as a database that includes data pertaining to mix information from a plurality of different content items and a plurality of different users (e.g., the playlist database 126), or a mix information database (not shown). For example, the database of which table 500 is a portion (or is extracted from) may include user-generated mix information for each of the content items in the streaming service's content library, to the extent that any user-generated mix information exists for those content items. In some implementations, mix information is not stored or displayed as a table; however, it is shown as a table here for purposes of explanation.

Table 500 includes columns representing various types of information, including:
track name 502 (e.g., the name of the content item, such as a song title)
track ID 504 (e.g., a unique identifier of the track, which can be used to differentiate between content items that have the same name);
user ID 506 (e.g., an identifier of the user who generated that instance of mix information);
fade-in start 508 (e.g., the user-selected time at which a "fade-in" portion of a crossfade begins, and/or at which the track begins to overlap with the previous track);
fade-in stop 510 (e.g., the user-selected time at which a "fade-in" portion of a crossfade ends, and/or at which the track ceases to overlap with the previous track);
fade-out start 512 (e.g., the user-selected time at which a "fade-out" portion of a crossfade begins, and/or at which the track begins to overlap with the following track);
fade-out stop 514 (e.g., the user-selected time at which a "fade-out" portion of a crossfade begins, and/or at which the track ceases to overlap with the following track);
fade-in effect 516 (e.g., a user-selected effect that is applied during a "fade-in" portion of the track); and
fade-out effect 518 (e.g., a user-selected effect that is applied during a "fade-out" portion of the track).

Table 500 also includes rows 550-554, each representing a mix instance for a particular song (e.g., a set of user-selected mix rules that were applied to that song in at least one instance).

As noted above, fade start and stop times 508-514 specify the starting and ending times (within the playback of the track) for fade-in and fade-out periods. Fade-in and fade-out periods relate to the fading that occurs during a crossfade between two tracks (for example, as discussed above with respect to FIGS. 4A-4E). In particular, the fade-in start time refers to the time at which the track begins to fade in. Frequently, this is at the very beginning of the song (i.e., at the 0:00 playback position), indicating that the fade-in includes the beginning of the song. However, as described herein with respect to FIGS. 4C-4E, a user may crop a portion of the song, such that a beginning portion is not played at all. In those cases, the fade-in start time will be after the beginning of the song. For example, rows 551 and 554 illustrate fade-in start times that are after the beginning of the song: row 551 specifies that the first 2 seconds of the song has been cropped, while row 554 specifies that the first 18 seconds of the song has been cropped.

In some cases, a song will not be crossfaded at either or both of the beginning or the end of the track. In such cases, the entry for that mix instance will reflect that no crossfade was applied. For example, entry 553 includes no data in the fade-in start 508 or the fade-in stop 510 columns.

Fade-out start time 512 refers to the playback time at which the track starts to fade-out during a crossfade period. For example, entry 550 specifies that the song will begin to fade out at a playback location of 4 minutes and 40 seconds.

The fade-out stop time 514 refers to the playback time at which the track is completely faded out (e.g., playback of the track has ceased). For example, entry 550 specifies that the song will be completely faded out at 4 minutes and 46 seconds. The song shown, "Stayin' Alive," is 4:46 long, so entry 550 specifies that the song is played to completion during the crossfade. By contrast, entry 552 specifies a fade-out stop time of 4:10, specifying that the song ceases to be played back at the playback location of 4:10, effectively cropping the remaining 36 seconds of the song (as illustrated in FIG. 4E, for example).

As noted above, fade-in effect 516 specifies an effect selected by a user for application during the fade-in period associated with a particular track, and fade-out effect 518 specifies an effect selected by a user for application during the fade-out period associated with the track. The effects in table 500 are illustrated according to the exemplary format described above: {Effect ID: Parameter Value 1, ..., Parameter Value n}. While only one column is shown for each of the fade-in and fade-out periods, in some implementations, multiple effects can be applied to each period, and an entry for such an instance would include information specifying the multiple effects. Effects need not be applied to tracks in any given instance. For example, entry 551 includes no data for the fade-out effect, indicating that no effect was selected for that portion of the song. Moreover, effects can also be applied to locations within songs that are not associated with a crossfade. For example, table 500 can include columns specifying effects and locations within a song where such effects are to be applied (not shown).

The particular format of table 500 and the data contained therein is merely exemplary, and other layouts, data types, columns, rows, etc., are contemplated as well. Moreover, the data represented in table 500 need not be represented and/or stored in tabular form. Instead, any technique for representing and/or storing data may be used.

As noted above, mix information, such as that illustrated in table 500, is used as a basis for creating crowdsourced mix rules and/or mix styles. For example, the streaming service may use user-generated mix information to determine popular effects and/or combinations of effects, and generate mix rules and/or mix styles based thereon. Specifically, the streaming service may determine that many users couple a reverb effect with a flanger effect, and create a mix style using these two effects. Values of effect parameters can also be based on the user-generated mix information. For example, in some implementations, parameter values from many different users are averaged, and the average value (or a value close to the average value) is used as the value for that particular parameter in the mix style. As an example, for a "flanger" effect, the average value for a "speed" parameter is calculated from a plurality of mix instances of a particular song. Alternatively, a median or a modal value (or any other appropriate value based on the mix information) may be used instead of and/or in addition to the average value when selecting a value to be used in a mix rule or mix style.

In some implementations, the streaming service creates preconfigured mix rules for particular tracks or combinations of tracks. For example, the streaming service can analyze all (or a subset of) the mix information for a particular track, and determine a set of mix rules for that particular track using the mix information. As an example, the mix information in FIG. 5A is used to determine mix rules that will be associated with the song "Stayin' Alive." These mix rules are then used when a user requests a mix including this song. The preconfigured mix rules can be generated in various ways. In some cases, they are generated at least partially automatically, using a computer-generated process to determine a set of mix rules, based on the crowdsourced mix information, that is most common and/or is most likely to be pleasing. In some cases, values of a particular mix rule (e.g., "fade-in start," "fade-in effect," etc.) are based on an average of the crowdsourced mix information. In some cases, values are based on a most-frequently selected value (e.g., a mode). In some cases, values are based on a median selected value.

In some implementations, preconfigured mix rules are created automatically. For example, a computer accesses the crowdsourced mix information and generates the mix rules without user intervention by applying a mix rule creation algorithm. A mix rule creation algorithm analyzes mix information and creates mix rules based thereon, including by identifying or calculating patterns, mean/median/modal values of playback parameters, and the like.

In some implementations, preconfigured mix rules are created partially automatically. For example, a computer accesses the crowdsourced mix information and generates candidate mix rules, and then a human operator reviews at least some of the candidate mix rules to determine whether they are satisfactory. The human operators may then tune, adjust, or otherwise modify the candidate mix rules based on one or more objective or subjective criteria (e.g., whether the mix rule results in a pleasing sound when applied).

FIG. 5B illustrates an exemplary table 560 that includes preconfigured rules for tracks and combinations of tracks (for example, based on mix information in table 500, FIG. 5A). The rows in table 560 represent preconfigured mix rules for a particular song (e.g., rows 561-564) or one or more songs (e.g., row 565). Columns 508-518 are described above.

Row 561, for example, represents preconfigured mix rules for the track "Stayin'Alive." As noted above, the preconfigured mix rules for this track (e.g., the fade-in start and stop times and effects, the fade-out start and stop times and effects) are generated based on the crowdsourced mix information for the track (e.g., as described with respect to FIG. 5A). Thus, when "Stayin' Alive" is selected to be mixed with another track (e.g., "Brick House," shown in Row 562), the preconfigured mix rules can be applied to the transition between the two songs.

Songs that are selected to be mixed will not necessarily have the same preconfigured mix rules. For example, the fade-out times and effects for "Stayin' Alive" and the fade-in times and effects for "Brick House" shown in FIG. 5B do not match, so if a user selects a crossfade between these two tracks (and requests or allows the service provider to use crowdsourced mix rules to define the transition), the service provider generates a set of mix rules for the selected transition based on one or both of the preconfigured mix rules.

In some implementations, the mix rules of one track take precedence over the other. The track that takes precedence can be determined in any appropriate way. For example, the preferred track is the track that was generated from a higher number of individual crowdsourced samples. As another example, the preferred track is the track for which the preconfigured mix rules have received a higher user rating. As yet another example, the preferred track is the track that is fading out (e.g., the fade-out times and effects of the first song take precedence over the fade-in times and effects of the second song), or the song that is fading in (e.g., the fade-in times and effects of the second song take precedence over the fade-out times and effects of the first song). Other techniques are also contemplated.

In some implementations, the mix rules of both tracks are combined. For example, the fade-in and fade-out durations of the two tracks are averaged to produce a single fade duration for the transition, and the selected effects for the fade-in and fade-out portions of each track can also be applied.

In some implementations where fade-in and fade-out durations are averaged, the fade-out start time for the first song is maintained, and the fade-out stop time is allowed to change to satisfy the new fade duration. Similarly, the fade-in stop time of the second song is maintained, and the fade-in start time is allowed to change to satisfy the new fade duration. As an example, if a user selects a crossfade from "Stayin' Alive" to "Brick House," and specifies that preconfigured mix rules are to be applied, the crowdsourced fade durations do not match: "Stayin' Alive" has a fade-out duration of 6 seconds, while "Brick House" has a fade-in duration of 4 seconds. The average fade duration of these songs is 5 seconds, which does not agree with the start and stop times listed for each song. Accordingly, as described, the fade-out start time of "Stayin' Alive" remains at 4:40, but the fade-out stop time changes to 4:45, and the fade-in start time of "Brick House" changes to 0:05, and the fade-in stop time remains at 0:10. Other ways of harmonizing the fade duration and start and stop times for multiple tracks are also contemplated.

Row 565 in FIG. 5B illustrates an example of a preconfigured mix rule for a pair of songs. This mix rule is generated based on crowdsourced mix information relating to a crossfade between these two particular tracks. Specifically, row 565 shows a crossfade between the tracks "Hot Stuff" and "When Doves Cry," with a crossfade duration of 5 seconds, and fade start and stop times as shown in columns 508-514 of FIG. 5B. Row 565 also shows, in column 518, an effect (including an effect ID and effect parameter value) for the crossfade.

A mix rule for a pair of songs may result when multiple users have manually selected crossfade parameters for these specific tracks (e.g., using techniques and/or interfaces described herein with respect to FIGS. 4A-4E). Where a predefined mix rule for a particular pair of tracks exists, it is not necessary to harmonize disparate mix rules (as described above with the mix of "Stayin' Alive" and "Brick House"), because fade start and stop times, fade duration, and fade effects were specifically intended to conform to one another. Thus, there is no discrepancy between the fade durations for each track, as is possible when crowdsourced mix rules for two independent tracks are combined.

In some implementations, instead of creating fully preconfigured mix rules based on crowdsourced mix information, the streaming service creates mix rules in real-time based on media content selected by a user. Specifically, the streaming service provides a mix rule or mix style that includes one or more unspecified parameter values, and the streaming service will populate the unspecified value(s) based on crowdsourced information relating to the particular content items to which the mix rule/style is to be applied. In this way, mix rules and mix styles can be customized for the particular content items that are selected, which can create higher quality mixes than would be possible with static parameter values. Moreover, the service provider does not need to create and store mix rules for each and every possible transition between songs in order to take advantage of the crowdsourced mix information.

As discussed below, crowdsourced mix information can be used in numerous ways to specify customized mix rules in real-time.

FIG. 6 illustrates an exemplary mix style table 600 that includes mix styles 602, 604, and 606, each having one or more unspecified values of playback parameters, where the unspecified values are to be looked up and/or generated once a mix style has been selected for application to one or more media content items (e.g., songs).

Mix style table 600 includes columns representing various types of information, including: mix style name 610 (e.g., a name or other identifier of the mix style); first song fade-out start 612 (e.g., the time at which the "fade-out" portion of a crossfade begins for the first song of a crossfade); first song fade-out stop 614 (e.g., the time at which the "fade-out" portion of a crossfade ends for the first song of a crossfade); second song fade-in start 616 (e.g., the time at which the "fade-in" portion of a crossfade begins for the second song of a crossfade); second song fade-in stop 618 (e.g., the time at which the "fade-in" portion of a crossfade stops for the second song of a crossfade); and effect 620 (e.g., a specification of an effect to be applied during the crossfade).

Mix style 602 is one example of a mix style that relies on a real-time lookup of crowdsourced information. Specifically, in place of a preconfigured value for the fade-in and fade-out periods of the first and second songs of a crossfade, mix style 602 includes a "lookup" command to indicate that the particular values for those parameters should be based on real-time crowdsourced information. For example, when a user selects the "vibrato crossfade" mix style for a transition between a first song and a second song, values of the fade-out start and stop parameters are extracted from crowdsourced mix information for the particular song to which the mix style is applied. As an example, if the first song in a crossfade transition is "Stayin' Alive," the streaming service (e.g., using any appropriate client device(s) and server systems(s)) determines (e.g., by performing a lookup in a database) that the most common "fade-out start" time is 4:40, and that the most common "fade-out stop" time is 4:46 (e.g., as shown in Table 500 of FIGS. 5A-5B). Accordingly, when the "vibrato crossfade" mix style is selected for application to the song "Stayin' Alive," the values of the fade-out start and stop times are customized for that particular song, using values that were manually selected by other users, thus increasing the chances that the crossfade will be aesthetically pleasing for that song.

Mix style 602 also includes unspecified values for the fade-in start and stop times for the second song of a crossfade. In this case, however, the values are not based on crowdsourced information for the second song, but instead match whatever values were identified for the first song. This ensures that the fade-in and fade-out periods of the songs are equal, resulting in a symmetrical crossfade (i.e., the first song fades-out at the same rate and over the same duration that the second song fades-in).

Mix style 604, the "best effect" mix, is another example of a mix style that relies on a real-time lookup of crowdsourced information. Specifically, in place of a preconfigured effect, mix style 604 includes a "lookup" command to indicate that the particular effect and corresponding parameter values to be applied to a selected transition should be based on real-time crowdsourced information. For example, when a user selects the "best effect" mix style for a transition between a first song and a second song, effect IDs and corresponding parameter values are extracted from crowdsourced mix information for the particular song or songs to which the mix style is applied. As a specific example, if the first song in a crossfade transition is "Stayin' Alive," the streaming service (e.g., using any appropriate client device(s) and server systems(s)) determines (e.g., by performing a lookup in a database) that the most common effect is "vibrato" having a speed of "5" and an intensity of "2." Accordingly, when the "best effect" mix style is selected for application to the song "Stayin' Alive," the effect and the values of the effect parameters are customized for that particular song using values that were manually selected by other users, thus increasing the chances that the crossfade will be aesthetically pleasing for that song.

As described above, the particular effect and parameters selected for a "best effect" mix can be based on the first song in the transition, based on the second song in the transition, or based on both songs in the transition. For example, if the "best effect" mix is selected for application to a transition between "Stayin' Alive" and "Brick House," the effect may be selected based on what other users have selected for "Stayin' Alive," regardless of the song that follows, or based on what other users have selected for "Brick House," regardless of the preceding song, or even based on what other users have selected for a transition between "Stayin' Alive" and "Brick House."

Mix style 606, the "magic mix," is another example of a mix style that relies on a real-time lookup of crowdsourced information. In this case, all of the values of the mix style are based on real-time crowdsourced information. For example, when a user selects the "magic mix" style for a transition between a first song and a second song, fade-in and fade-out periods of the first and second songs, as well as the effect IDs and corresponding parameter values, are extracted from crowdsourced mix information for the particular song (or songs) to which the mix style is applied. Specific examples of looking up fade-in and fade-out periods are described above with respect to mix style 602, and specific examples of looking up effect IDs and corresponding parameter values are described above with respect to mix style 604. For brevity, those discussions are not repeated here.

The unspecified playback parameters in mix rules 602, 604, and 606 are exemplary, and more, fewer, or different playback parameters may be unspecified in any given mix rule. In various implementations, the unspecified playback parameters include any of the playback parameters described herein, or any combination thereof. Moreover, the contents of mix style table 600 are also exemplary, and more, fewer, or different information may be included in a mix style table according to various implementations.

Figure 7:
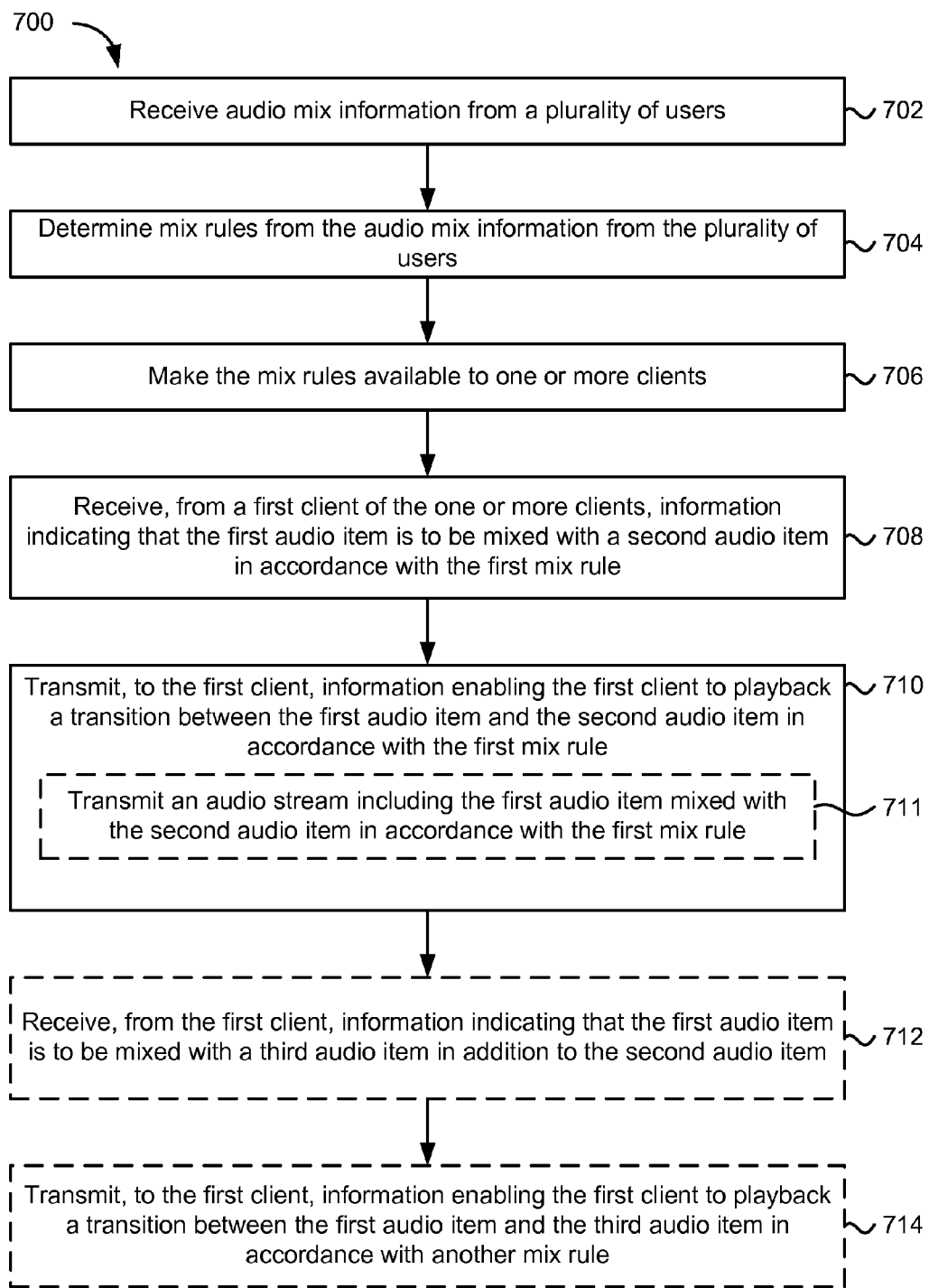
FIG. 7 is a flowchart of a method for mixing music, in accordance with some implementations.

FIG. 7 is a flow diagram illustrating a method 700 of mixing music, in accordance with some implementations. The method 700 is performed at an electronic device (e.g., server system 120-1 as shown in FIGS. 1A-1B and 3). Some operations in method 700 are, optionally, combined and/or the order of some operations is, optionally, changed.

A device (e.g., the server system 120-1 shown in FIGS. 1A-1B and 3) receives audio mix information from a plurality of users (702). Audio mix information is received in any appropriate manner. For example, playlists including mix information are generated by users on client devices (e.g., client devices 110-n) and stored in a playlist database 126 of the server system 120-1. As another example, playlists including mix information are initially stored on client devices (e.g., client devices 110-n), and are uploaded to or retrieved by the server system 120-1, for example, when accounts are synchronized with the server system 120-1, on a predetermined schedule, or at any other appropriate time.

In some implementations, the received audio mix information includes user-selected values of a set of one or more playback parameters used to generate transitions between overlapping audio items. Examples of user selected values of playback parameters include fade-in and fade-out start/stop times, effect identifiers and values, and the like.

The device determines mix rules from the audio mix information from the plurality of users (704). The mix rules include a first mix rule (e.g., predefined values of a set of one or more playback parameters) associated with a first audio item, where the first mix rule relates to an overlap of the first audio item with another audio item (e.g., a crossfade). In some implementations, the first mix rule relates to an overlap of the ending of the first audio item with the beginning of the other audio item (e.g., a rule relating to a fade-out of the first song).

In some implementations, the mix rules also include a second mix rule associated with the first audio item, where the second mix rule relates to an overlap of a beginning of the first audio item with an ending of a preceding audio item (e.g., a rule relating to a fade-in of the first song). Techniques for determining mix rules from audio mix information from a plurality of users are discussed above with respect to FIGS. 5A-6.

While the first and second mix rules described above relate to a transition and/or an overlap of two audio items, they are associated only with one particular audio item (e.g., as described with respect to rows 561-564 in FIG. 5B). In some implementations, the mix rules also include a third mix rule associated with a pair of audio items (e.g., as described with respect to row 565, FIG. 5B), rather than just a single audio item.

The device then makes the mix rules (e.g., the first, second, and/or third mix rule, or any other mix rule of the plurality of mix rules) available to one or more clients (706). For example, the device stores the mix rules (either locally or on one or more devices a peer-to-peer network) for transmission to one or more clients. As another example, the device stores the mix rules so that they can be applied to audio items prior to the audio items being sent to a client that requests the audio items and the mix rules.

In some implementations, the device receives, from a first client of the one or more clients, information indicating that the first audio item is to be mixed with a second audio item in accordance with the first mix rule (708). For example, a user may select the first mix rule from a list of available mix rules. Alternatively, a user may select a mix style (e.g., a combination of mix rules) for the first and second audio items, where the mix style incorporates the first mix rule.

The device (e.g., the server system 120-1) then transmits, to the first client, information enabling the first client to playback a transition between the first audio item and the second audio item in accordance with the first mix rule (710). As described above, one example of such a transition is a crossfade between two adjacent audio items in a playlist (e.g., the ending of the first audio item is to be mixed with the beginning of the second audio item).

In some implementations, the information that is transmitted to the first client includes an audio stream that includes the first audio item and the second audio item mixed in accordance with the first mix rule.

In some implementations, the information that is transmitted to the first client includes a specification of the mix rule, and the first client applies the mix rule to the first and second audio items to create an audio stream that includes the transition. Specifically, processing the audio items in accordance with the mix rule (e.g., manipulation of a media file to produce the desired transition or effect) is performed by the client device.

The device (e.g., the server system 120-1) can also receive, from the first client, information indicating that the first audio item is to be mixed with a third audio item in addition to the second audio item (712). For example, a crossfade is to be applied at the beginning of the first audio item (from a third audio item that precedes the first audio item) and the end of the first audio item (to a second audio item that follows the first audio item).

The device (e.g., the server system 120-1) then transmits, to the first client, information enabling the first client to playback a transition between the first audio item and the third audio item in accordance with another mix rule (714).

In some implementations, the device (e.g., the server system 120-1) receives from an additional client of the one or more clients (e.g., a second client) information indicating that the first audio item is to be mixed with the second audio item in accordance with the first mix rule. Specifically, the second client requests the same transition as the first client. The device then transmits, to the second client, information enabling the second client to playback the requested transition (e.g., as described above with respect to step 710).

In some implementations where making the first mix rule available to a client includes transmitting information to the client device (e.g., information specifying selected mix rules), the client device mixes the audio items, in accordance with the received information. Specifically, generating the audio for the transition is performed on the client device.

In other implementations, making the first mix rule available to the client device includes transmitting, to the client device, an audio stream including the first audio item mixed with the second audio item in accordance with the first mix rule (711). For example, the audio items are mixed, in accordance with the mix information, at a separate device (e.g., the server system 120-1, another client device, or any other device from the media delivery system 150), and audio data for the first and second audio items as well as the transition are delivered to the client device ready for playback (i.e., they are streamed). In such cases, the client device (and/or the software of the client device) can be simpler, as the audio processing for generating the mixing is performed at a different device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. For brevity, these details are not repeated here.

Plural instances are, optionally provided for components, operations, or structures described herein as a single instance. Finally, boundaries between various components, operations, and data stores are somewhat arbitrary, and particular operations are illustrated in the context of specific illustrative configurations. Other allocations of functionality are envisioned and optionally fall within the scope of the implementation(s). In general, structures and functionality presented as separate components in the example configurations are, optionally, implemented as a combined structure or component. Similarly, structures and functionality presented as a single component are, optionally, implemented as separate components. These and other variations, modifications, additions, and improvements fall within the scope of the implementation(s).

It will also be understood that, although the terms "first," "second," are, in some circumstances, used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" is, optionally, construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter is, optionally, practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computer system, comprising:
   one or more processors; and
   memory storing one or more programs configured to be executed by the one or more processors, the one or more programs including instructions for:
   receiving, via one or more networks, audio mix information for a first audio item from client devices for a plurality of users, wherein the audio mix information includes user-selected values for one or more playback parameters that were used by the plurality of users to generate transitions for the first audio item, wherein the transitions included overlap between the first audio item and other audio items, and wherein the user-selected values for the one or more playback parameters were specified by user inputs from the plurality of users;

determining a first mix rule using the user-selected values for the one or more playback parameters received from the client devices for the plurality of users, the first mix rule relating to determining overlap of the first audio item with audio items in respective transitions; and making the first mix rule available via one or more networks to a plurality of client devices;

applying the first mix rule to generate transitions between the first audio item and other audio items for the plurality of client devices; and transmitting the transitions generated by applying the first mix rule to respective client devices of the plurality of client devices to enable the respective client devices to play the transitions generated by applying the first mix rule.

2. The computer system of claim 1, wherein the first mix rule specifies predefined values of the one or more playback parameters.

3. The computer system of claim 1, the one or more programs further including instructions for:

receiving, from a first client device of the plurality of client devices, information indicating that the first audio item is to be mixed with a second audio item in accordance with the first mix rule;

wherein transmitting the transitions generated by applying the first mix rule to the respective client devices includes transmitting, to the first client device, information enabling the first client device to playback a transition between the first audio item and the second audio item in accordance with the first mix rule.

4. The computer system of claim 3, wherein the second audio item is adjacent to the first audio item in a playlist associated with a user of the first client device.

5. The computer system of claim 4, wherein the first audio item precedes the second audio item in the playlist.

6. The computer system of claim 4, wherein the second audio item precedes the first audio item in the playlist.

7. The computer system of claim 3, wherein the information indicating that the first audio item is to be mixed with the second audio item in accordance with the first mix rule specifies that an ending of the first audio item is to be mixed with a beginning of the second audio item.

8. The computer system of claim 3, the one or more programs further including instructions for:

receiving, from a second client device of the plurality of client devices, information indicating that the first audio item is to be mixed with the second audio item in accordance with the first mix rule;

wherein-transmitting the transitions generated by applying the first mix rule to the respective client devices includes transmitting, to the second client device, information enabling the second client device to playback a transition between the first audio item and the second audio item in accordance with the first mix rule.

9. The computer system of claim 1, wherein:

the first mix rule is a respective mix rule of a plurality of mix rules;

the first mix rule relates to determining an overlap of an ending of the first audio item with a beginning of a next audio item; and the plurality of mix rules includes a second mix rule relating to determining an overlap of a beginning of the first audio item with an ending of a preceding audio item.

10. The computer system of claim 9, the one or more programs further including instructions for:

receiving, from a first client device of the plurality of client devices, information indicating that the first audio item is to be mixed with a third audio item in accordance with the second mix rule, wherein the third audio item precedes the first audio item in a playlist associated with the first client device; and transmitting, to the first client device, information enabling the first client device to playback a transition between the third audio item and the first audio item in accordance with the second mix rule.

11. The computer system of claim 1, wherein the first mix rule is a respective mix rule of a plurality of mix rules that includes a second mix rule associated with a pair of audio items, the second mix rule relating to determining an overlap of the pair of audio items;

the one or more programs further including instructions for:

receiving, from a third client device of the plurality of client devices, information indicating that the pair of audio items are to be mixed in accordance with the second mix rule; and transmitting, to the third client device, information enabling the third client device to playback a transition between the pair of audio items in accordance with the second mix rule.

12. The computer system of claim 1, wherein the first mix rule includes an overlap starting position of the first audio item, indicating a playback time at which to begin overlapping the first audio item with a following audio item.

13. The computer system of claim 12, wherein:

the user-selected values for the one or more playback parameters include overlap starting position values; and the overlap starting position of the first audio item is a median of the overlap starting position values.

14. The computer system of claim 12, wherein:

the user-selected values for the one or more playback parameters include overlap starting position values; and the overlap starting position of the first audio item is a mean of the overlap starting position values.

15. The computer system of claim 1, wherein the first mix rule includes an overlap ending position of the first audio item, indicating a playback time at which to end overlapping the first audio item with a preceding audio item.

16. The computer system of claim 1, wherein the first mix rule specifies an effect to be applied to one or both of the first audio item and another audio item during the overlap of the first audio item and the other audio item.

17. The computer system of claim 1, the one or more programs further including instructions for:

receiving, from a first client device of the plurality of client devices, information indicating that the first audio item is to be mixed with a second audio item in accordance with the first mix rule; and wherein transmitting the transitions generated by applying the first mix rule to the respective client devices includes transmitting, to the first client device, an audio stream including a generated transition of the first audio item mixed with the second audio item in accordance with the first mix rule.

18. The computer system of claim 1, wherein the first mix rule is a respective mix rule of a plurality of mix rules; and the one or more programs further include instructions for organizing the plurality of mix rules into one or more mix styles.

19. The computer system of claim 18, wherein respective ones of the mix styles include two or more of the mix rules.

* * * * *